United States Patent
Miracle et al.

(10) Patent No.: US 9,856,439 B2
(45) Date of Patent: Jan. 2, 2018

(54) THIOPHENE AZO DYES AND LAUNDRY CARE COMPOSITIONS CONTAINING THE SAME

(71) Applicant: The Procter & Gamble Company, Cincinnati, OH (US)

(72) Inventors: Gregory Scot Miracle, Hamilton, OH (US); Robert Linn Mahaffey, Jr., Spartanburg, SC (US); Xiaoyong Michael Hong, Greer, SC (US); Eduardo Torres, Boiling Springs, SC (US); Dominick Joseph Valenti, Greenville, SC (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/272,463

(22) Filed: Sep. 22, 2016

(65) Prior Publication Data

US 2017/0009186 A1  Jan. 12, 2017

Related U.S. Application Data

(63) Continuation of application No. 14/608,292, filed on Jan. 29, 2015, now Pat. No. 9,487,740, which is a continuation of application No. 14/222,705, filed on Mar. 24, 2014, now Pat. No. 8,979,946, which is a continuation of application No. 13/286,341, filed on Nov. 1, 2011, now Pat. No. 8,715,368.

(60) Provisional application No. 61/412,988, filed on Nov. 12, 2010.

(51) Int. Cl.
| | | |
|---|---|---|
| C11D 3/00 | (2006.01) | |
| C11D 17/00 | (2006.01) | |
| C11D 3/42 | (2006.01) | |
| C11D 3/40 | (2006.01) | |
| C09B 44/04 | (2006.01) | |
| C09B 44/10 | (2006.01) | |
| C11D 3/34 | (2006.01) | |
| C11D 3/50 | (2006.01) | |
| C11D 11/00 | (2006.01) | |
| C09B 44/14 | (2006.01) | |
| C11D 3/43 | (2006.01) | |
| C11D 17/04 | (2006.01) | |

(52) U.S. Cl.
CPC .............. *C11D 3/42* (2013.01); *C09B 44/04* (2013.01); *C09B 44/107* (2013.01); *C09B 44/108* (2013.01); *C09B 44/14* (2013.01); *C11D 3/349* (2013.01); *C11D 3/40* (2013.01); *C11D 3/43* (2013.01); *C11D 3/505* (2013.01); *C11D 11/0017* (2013.01); *C11D 17/041* (2013.01)

(58) Field of Classification Search
CPC .. C11D 3/42; C11D 3/40; C09B 44/04; C09B 44/107; C09B 44/108
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |
| 3,082,114 A | 3/1963 | Balli et al. |
| 3,172,723 A | 3/1965 | Hay et al. |
| 3,186,155 A | 6/1965 | Breen et al. |
| 3,215,486 A | 11/1965 | Hada et al. |
| 3,415,904 A | 12/1968 | Taniguchi et al. |
| 3,584,991 A | 6/1971 | Sturkey |
| 3,629,241 A | 12/1971 | Krause et al. |
| 3,748,093 A | 7/1973 | Gangwisch et al. |
| 3,758,335 A | 9/1973 | Bergman et al. |
| 3,929,678 A | 12/1975 | Laughman et al. |
| 3,958,928 A | 5/1976 | Lala |

(Continued)

FOREIGN PATENT DOCUMENTS

| | | |
|---|---|---|
| DE | 25 57 783 A1 | 7/1977 |
| DE | 4 224 039 A1 | 1/1993 |

(Continued)

OTHER PUBLICATIONS

Vicente Del Amo, Adam P McGlone, Clive Foster and Anthony P Davis, A Blue Dye for Substrate Tagging in the Two-Color Screening of Combinatorial Libraries, Journal of Combinational Chemistry, 2005. pp. 1-3, vol. 7(1);American Chemical Society, Bristol UK.

(Continued)

*Primary Examiner* — Eisa Elhilo
(74) *Attorney, Agent, or Firm* — John T. Dipre; Steven W. Miller

(57) ABSTRACT

This application relates to thiophene azo dyes for use as hueing agents, laundry care compositions comprising such thiophene azo dyes, processes for making such thiophene azo dyes, and laundry care compositions and methods of using the same. The thiophene azo dyes contain a formally charged moiety and are generally comprised of at least two components: at least one chromophore component and at least one polymeric component. Suitable chromophore components generally fluoresce blue, red, violet, or purple color when exposed to ultraviolet light, or they may absorb light to reflect these same shades. These thiophene azo dyes are advantageous in providing a hueing effect, for example, a whitening effect to fabrics, while not building up over time and causing undesirable blue discoloration to the treated fabrics. The thiophene azo dyes are also generally stable to bleaching agents used in laundry care compositions.

7 Claims, No Drawings

(56) References Cited

U.S. PATENT DOCUMENTS

| | | |
|---|---|---|
| 3,961,880 A | 6/1976 | Reinert et al. |
| 3,986,972 A | 10/1976 | Loffelman et al. |
| 4,137,243 A | 1/1979 | Farmer |
| 4,197,087 A | 4/1980 | Ami et al. |
| 4,217,105 A | 8/1980 | Goodman |
| 4,228,042 A | 10/1980 | Letton |
| 4,239,660 A | 12/1980 | Kingry |
| 4,260,529 A | 4/1981 | Letton |
| 4,264,495 A | 4/1981 | Maher et al. |
| 4,270,236 A | 6/1981 | Zurbuchen et al. |
| 4,283,197 A | 8/1981 | Schurings et al. |
| 4,298,490 A | 11/1981 | Lange et al. |
| 4,412,934 A | 11/1983 | Chung et al. |
| 4,430,243 A | 2/1984 | Bragg |
| 5,284,944 A | 2/1984 | Madison et al. |
| 4,454,146 A | 6/1984 | Borovian |
| 4,459,229 A | 7/1984 | Weaver et al. |
| 4,460,374 A | 7/1984 | Abel et al. |
| 4,483,779 A | 11/1984 | Llenado |
| 4,483,780 A | 11/1984 | Llenado |
| 4,483,781 A | 11/1984 | Hartman |
| 4,494,957 A | 1/1985 | Niwa et al. |
| 4,507,407 A | 3/1985 | Kluger et al. |
| 4,565,647 A | 1/1986 | Llenado |
| 4,593,088 A | 6/1986 | Gourley |
| 4,601,725 A | 7/1986 | Keller et al. |
| 4,602,916 A | 7/1986 | Wilson |
| 4,634,551 A | 1/1987 | Burns et al. |
| 4,640,690 A | 2/1987 | Baumgartner et al. |
| 4,728,453 A | 3/1988 | Choy |
| 4,728,455 A | 3/1988 | Revek |
| 4,732,570 A | 3/1988 | Baumgartner et al. |
| 4,775,748 A | 10/1988 | Kluger et al. |
| 4,800,037 A | 1/1989 | Mazzola |
| 4,810,410 A | 3/1989 | Diakun et al. |
| 4,855,413 A | 8/1989 | Dehnert et al. |
| 4,871,371 A | 10/1989 | Harris |
| 4,886,517 A | 12/1989 | Bugaut et al. |
| 4,912,203 A | 3/1990 | Kluger et al. |
| 4,915,854 A | 4/1990 | Mao et al. |
| 4,966,723 A | 10/1990 | Hodge et al. |
| 4,992,204 A | 2/1991 | Kluger et al. |
| 5,004,558 A | 4/1991 | Dyroff et al. |
| 5,039,782 A | 8/1991 | Langer et al. |
| 5,049,311 A | 9/1991 | Rasheed et al. |
| 5,059,244 A | 10/1991 | King et al. |
| 5,082,578 A | 1/1992 | Langer et al. |
| 5,114,606 A | 5/1992 | Van Vliet et al. |
| 5,114,611 A | 5/1992 | Van Kralinger et al. |
| 5,130,045 A | 7/1992 | Mitchell et al. |
| 5,132,431 A | 7/1992 | Fuchs |
| 5,153,161 A | 10/1992 | Kerschner et al. |
| 5,164,100 A | 11/1992 | Langer et al. |
| 5,176,745 A | 1/1993 | Moore et al. |
| 5,194,416 A | 3/1993 | Jureller et al. |
| 5,227,084 A | 7/1993 | Martens et al. |
| 5,244,594 A | 9/1993 | Favre et al. |
| 5,246,612 A | 9/1993 | Van Dijik et al. |
| 5,246,620 A | 9/1993 | Gethoffer et al. |
| 5,246,621 A | 9/1993 | Favre et al. |
| 5,256,779 A | 10/1993 | Kershner et al. |
| 5,274,147 A | 12/1993 | Kerschner et al. |
| 5,279,757 A | 1/1994 | Gethoffer et al. |
| 5,280,117 A | 1/1994 | Kershner et al. |
| 5,332,528 A | 4/1994 | Pan |
| 5,310,887 A | 5/1994 | Moore et al. |
| 5,346,588 A | 9/1994 | Sixta et al. |
| 5,370,826 A | 12/1994 | Madison et al. |
| 5,405,413 A | 4/1995 | Willey et al. |
| 5,360,569 A | 8/1995 | Madison et al. |
| 5,442,066 A | 8/1995 | Madison et al. |
| 5,460,747 A | 10/1995 | Gosselink et al. |
| 5,466,790 A | 11/1995 | Gruettner-Merten et al. |
| 5,478,357 A | 12/1995 | Madison et al. |
| 5,482,515 A | 1/1996 | Madison et al. |
| 5,503,639 A | 4/1996 | Willey et al. |
| 5,523,434 A | 6/1996 | Burns |
| 5,550,256 A | 8/1996 | Madison et al. |
| 5,574,179 A | 11/1996 | Wahl et al. |
| 5,576,282 A | 11/1996 | Miracle et al. |
| 5,578,136 A | 11/1996 | Taylor et al. |
| 5,584,888 A | 12/1996 | Miracle et al. |
| 5,591,833 A | 1/1997 | Hines et al. |
| 5,595,967 A | 1/1997 | Miracle et al. |
| 5,597,936 A | 1/1997 | Perkins et al. |
| 5,641,739 A | 6/1997 | Kott et al. |
| 5,654,421 A | 8/1997 | Willey et al. |
| 5,695,679 A | 9/1997 | Christie et al. |
| 5,686,014 A | 11/1997 | Baillely et al. |
| 5,686,015 A | 11/1997 | Willey et al. |
| 5,686,401 A | 11/1997 | Willey et al. |
| 5,698,504 A | 12/1997 | Christie et al. |
| 5,703,030 A | 12/1997 | Perkins et al. |
| 5,714,452 A | 2/1998 | Brouwer |
| 5,728,671 A | 3/1998 | Rohrbaugh et al. |
| 5,739,327 A | 4/1998 | Arbogast et al. |
| 5,741,437 A | 4/1998 | Arbogast et al. |
| 5,759,990 A | 6/1998 | Wahl et al. |
| 5,782,934 A | 7/1998 | Hall et al. |
| 5,877,315 A | 3/1999 | Deline et al. |
| 5,916,481 A | 6/1999 | Willey |
| 5,948,153 A | 9/1999 | Ann et al. |
| 5,958,289 A | 9/1999 | Arbogast et al. |
| 5,998,350 A | 12/1999 | Burns |
| 6,004,922 A | 12/1999 | Watson |
| 6,008,181 A | 12/1999 | Cripe et al. |
| 6,017,464 A | 1/2000 | Deline |
| 6,020,303 A | 2/2000 | Cripe et al. |
| 6,022,844 A | 2/2000 | Baillely et al. |
| 6,060,443 A | 5/2000 | Cripe et al. |
| 6,063,750 A | 5/2000 | Loffler et al. |
| 6,093,856 A | 7/2000 | Cripe et al. |
| 6,133,216 A | 10/2000 | Loffler et al. |
| 6,136,769 A | 10/2000 | Asano et al. |
| 6,140,294 A | 10/2000 | Delroisse st al. |
| 6,150,322 A | 11/2000 | Singleton |
| 6,150,494 A | 11/2000 | Wang et al. |
| 6,153,577 A | 11/2000 | Cripe et al. |
| 6,180,123 B1 | 1/2001 | Mondet |
| 6,214,963 B1 | 4/2001 | Noguchi et al. |
| 6,221,825 B1 | 4/2001 | Williams et al. |
| 6,225,464 B1 | 5/2001 | Hiler, II et al. |
| 6,287,580 B1 | 9/2001 | Gott et al. |
| 6,302,921 B1 | 10/2001 | Delroisse et al. |
| 6,306,812 B1 | 10/2001 | Perkins et al. |
| 6,326,348 B1 | 12/2001 | Vinson et al. |
| 6,417,155 B1 | 7/2002 | Zhou et al. |
| 6,482,994 B2 | 11/2002 | Scheper et al. |
| 6,494,920 B1 | 12/2002 | Weuthen et al. |
| 6,521,581 B1 | 2/2003 | Hsu et al. |
| 6,548,649 B2 | 4/2003 | Mikoshiba et al. |
| 6,616,711 B1 | 9/2003 | Känzig et al. |
| 6,723,846 B1 | 4/2004 | Metzger et al. |
| 6,875,811 B2 | 4/2005 | Danielson et al. |
| 7,205,269 B2 | 4/2007 | Sadlowski |
| 7,208,459 B2 | 4/2007 | Sadlowski et al. |
| 7,235,518 B2 | 6/2007 | Brush et al. |
| 7,416,593 B2 | 8/2008 | Hasemann |
| 7,642,282 B2 | 1/2010 | Valenti et al. |
| 7,674,757 B2 | 3/2010 | Torres et al. |
| 8,022,100 B2 | 9/2011 | Valenti |
| 8,138,222 B2 | 3/2012 | Valenti |
| 8,247,364 B2 | 8/2012 | Sadlowski et al. |
| 8,268,016 B2 | 9/2012 | Batchelor |
| 8,367,598 B2 | 2/2013 | Sadlowski et al. |
| 8,703,688 B2 | 4/2014 | Sadlowski et al. |
| 8,715,368 B2 | 5/2014 | Miracle et al. |
| 2001/0031806 A1 | 10/2001 | Lutkenhorst et al. |
| 2002/0062763 A1 | 5/2002 | Macholdt et al. |
| 2002/0151235 A1 | 10/2002 | Bartl et al. |
| 2003/0082349 A1 | 5/2003 | Batlaw |
| 2003/0136701 A1 | 7/2003 | Giblin et al. |
| 2003/0212172 A1 | 11/2003 | Danielson et al. |
| 2004/0204337 A1 | 10/2004 | Carona et al. |

(56) References Cited

U.S. PATENT DOCUMENTS

| | | |
|---|---|---|
| 2004/0229769 A1 | 11/2004 | Smith et al. |
| 2005/0235429 A1 | 10/2005 | Weber et al. |
| 2005/0288206 A1 | 12/2005 | Sadlowski et al. |
| 2005/0288207 A1 | 12/2005 | Sadlowski et al. |
| 2006/0019860 A1 | 1/2006 | Cardozo et al. |
| 2006/0079438 A1 | 4/2006 | Brush et al. |
| 2006/0183658 A1 | 8/2006 | Sadlowski et al. |
| 2006/0229224 A1 | 10/2006 | Batchelor |
| 2007/0203053 A1 | 8/2007 | Torres et al. |
| 2008/0034511 A1 | 2/2008 | Batchelor et al. |
| 2008/0096789 A1 | 4/2008 | Batchelor |
| 2008/0177089 A1 | 7/2008 | Sadlowski et al. |
| 2008/0177090 A1* | 7/2008 | Valenti ............... C08G 65/3348 549/68 |
| 2008/0235884 A1 | 10/2008 | Sadlowski et al. |
| 2009/0223003 A1 | 9/2009 | Batchelor et al. |
| 2009/0286709 A1 | 11/2009 | Sadlowski et al. |
| 2009/0312220 A1 | 12/2009 | Boutoille |
| 2010/0080831 A1 | 4/2010 | Braeckman et al. |
| 2010/0115707 A1 | 5/2010 | Batchelor |
| 2012/0117736 A1 | 5/2012 | Miracle |
| 2012/0123101 A1 | 5/2012 | Torres et al. |
| 2012/0178665 A1 | 7/2012 | Valenti |
| 2012/0277139 A1 | 11/2012 | Sadlowski et al. |
| 2012/0304398 A1 | 12/2012 | Miracle |
| 2012/0304402 A1 | 12/2012 | Miracle |
| 2012/0309945 A1 | 12/2012 | Torres et al. |
| 2013/0116160 A1 | 5/2013 | Sadlowski et al. |
| 2014/0187463 A1 | 7/2014 | Sadlowski et al. |
| 2014/0201928 A1 | 7/2014 | Miracle et al. |
| 2015/0000048 A1 | 1/2015 | Miracle et al. |
| 2015/0141314 A1 | 5/2015 | Miracle et al. |
| 2016/0024442 A1 | 1/2016 | Sadlowski et al. |
| 2016/0075977 A1 | 3/2016 | Miracle et al. |

FOREIGN PATENT DOCUMENTS

| | | |
|---|---|---|
| EP | 0 006 271 A1 | 1/1980 |
| EP | 0 133354 A1 | 2/1985 |
| EP | 537381 A1 | 10/1991 |
| EP | 0 166 566 B1 | 10/1992 |
| EP | 544440 A2 | 6/1993 |
| EP | 544490 A1 | 6/1993 |
| EP | 549271 A1 | 6/1993 |
| EP | 549272 A1 | 6/1993 |
| EP | 0 790 244 A1 | 8/1997 |
| EP | 1 095 985 A1 | 5/2001 |
| GB | 1425029 | 12/1973 |
| GB | 1 419 125 A | 12/1975 |
| JP | S49-066719 A | 6/1974 |
| JP | S59-170147 A | 9/1984 |
| JP | S63-230773 A | 9/1988 |
| JP | 01 180816 A2 | 7/1989 |
| JP | 2007/099825 | 4/2007 |
| JP | 2009-522440 A | 6/2009 |
| JP | 2009-523903 A | 6/2009 |
| JP | 2010-209294 A | 9/2010 |
| WO | WO 92/06162 A1 | 4/1992 |
| WO | WO 93/19038 A1 | 9/1993 |
| WO | WO 93/19146 A1 | 9/1993 |
| WO | WO 94/09099 A1 | 4/1994 |
| WO | WO 94/28102 A1 | 12/1994 |
| WO | WO 94/28104 A1 | 12/1994 |
| WO | WO 95/13351 A1 | 5/1995 |
| WO | WO 95/13352 A1 | 5/1995 |
| WO | WO 95/13353 A1 | 5/1995 |
| WO | WO 96/40661 A1 | 12/1996 |
| WO | WO 97/26315 A1 | 7/1997 |
| WO | WO 98/35002 A1 | 8/1998 |
| WO | WO 98/35003 A1 | 8/1998 |
| WO | WO 98/35004 A1 | 8/1998 |
| WO | WO 98/35005 A1 | 8/1998 |
| WO | WO 98/35006 A1 | 8/1998 |
| WO | WO 99/05082 A1 | 2/1999 |
| WO | WO 99/05084 A1 | 2/1999 |
| WO | WO 99/05241 A1 | 2/1999 |
| WO | WO 99/05242 A1 | 2/1999 |
| WO | WO 99/05243 A1 | 2/1999 |
| WO | WO 99/05244 A1 | 2/1999 |
| WO | WO 99/07656 A2 | 2/1999 |
| WO | WO 99/014296 A1 | 3/1999 |
| WO | WO 99/27065 A1 | 6/1999 |
| WO | WO 00/23548 A1 | 4/2000 |
| WO | WO 00/23549 A1 | 4/2000 |
| WO | WO 00/32601 A2 | 6/2000 |
| WO | WO 00/47708 A1 | 8/2000 |
| WO | WO 01/42408 A2 | 6/2001 |
| WO | WO 2006/021285 A1 | 3/2006 |
| WO | WO 2006/027086 A1 | 3/2006 |
| WO | WO 2007/111887 A2 | 10/2007 |
| WO | WO 2008/087497 A1 | 7/2008 |
| WO | WO 2009/087032 A1 | 7/2009 |
| WO | WO 2010/030539 A1 | 3/2010 |
| WO | WO 2011/011799 A2 | 1/2011 |
| WO | WO 2011/017719 A2 | 2/2011 |
| WO | WO 2013/142486 A1 | 9/2013 |

OTHER PUBLICATIONS

D.W. Rangnekar, Synthesis of navel thieno[2,3-b]thiophene bisazo disperse dyes, Journal of Indian Council of Chemists. 2000, pp. 11-14, vol. 17(1), Indian Council of Chemists, Mumbai, India (abstract).

International Search Report dated Oct. 18, 2012, containing 8 pages for US Publication. No. 2012/0304402 A1.

STIC Search Report dated Jul. 24, 2013.

Maradiya H R, et al., "Synthesis of novel azo dyes containing the thiophene moiety", Chemistry of Heterocyclic Compounds, 2002, pp. 1324-1330, vol. 38, No. 11.

Ehab Abdel-Latif, et al., "Synthesis of some 4-arylazo-3-hydroxythiophene disperse dyes for dyeing polyester fabrics", Monatshefte für Chemie, Nov. 16, 2007, pp. 561-567. vol. 139.

EP Examination Report; Application No. 10 781 555.7-1357; dated Jul. 24, 2014; 4 pages.

Kirk Othmer's Encyclopedia of Chemical Technology, $4^{th}$ Ed (1992, John Wiley & Sons), vol. 4, pp. 271-300 Bleaching Agents (Survey).

Kirk Othmer, Encyclopedia of Chemical Technology, vol. 17, John Wiley and Sons, 1982 at pp. 27-90 and pp. 63-72.

M. L. Tobe, Base Hydrolysis of Transition-Metal Complexes, Adv. Igorg. Bioinorg. Mech. (1983), 2, pp. 1-94.

J. Chem Ed. (1989), 66 (12), 1043-45; The Synthesis and Characterization of Inorganic Compounds, W. L. Jolly (Prentice-Hall; 1970), pp. 461-3.

Inorg. Chem. 18, 1497-1502 (1979).

Inorg. Chem 21, 2881-2885 (1982).

Inorg. Chem, 18, 2023-2025 (1979).

Inorg. Synthesis, 173-176 (1960).

Journal of Physical Chemistry, 56, 22-25 (1952).

Rolf Griesser, Ciba-Geigy Ltd. "Whitenss and Tint", Jun 1993.

(Liu Jun-na, Chen Zhi-rongb, and Yuan Shen-feng, Journal of Zhejiang university Science, 6B(6), 2005, pp. 584-589).

International Search Report, dated Feb. 18, 2008, 7 pages.

Simmons, Deena M., et al., Characterization of Six Textile Dyes as Fluorescent Stains for Flow Cytometry, The Journal of Histochemistry and Cytochemistry, 1990, pp. 41-49, vol. 38, No. 1.

Performance Fibers; Material Safety Data Sheet; Polyester Fiber and Resin; MSDS No. PF0002; Current Issue Date: Nov. 2009; 6 pages.

Technical Bulletin/ Printed Circuit Board Film; Physical Properties of Polyester Film Base; High Complexity PCB Starts With the Right Phototools; Mar. 2010; Kodak Publication No. Ti-2598; Eastman Kodak Company; Rochester, NY.

Hallas Geoffrey, et al., Dyes Derived from Aminothiophenes—Part 3. Application of some Disperse Dyes Derived from 2-Aminothiophenes to Hydrophobic Fibres, Dyes and Pigments, 1997, pp. 215-228, vol. 33, No. 3.

(56) References Cited

OTHER PUBLICATIONS

Harold, Richard W., Objective Instrumental Shade Sorting, Color Technology in the Textile Industry, Edited by Gultekin Celikiz and Rolf G. Kuehni, pp. 155-161.

Hansen, Charles M., Solubility Parameters—An Introduction, Hansen Solubility Parameters, A User's Handbook, CRC Press, 2000, pp. 1-23.

De, Swati, et al., Enhanced fluorescence of triphenylmethane dyes in aqueous surfactant solutions at supramicellar concentrations—effect of added electrolyte, Spectrochimica Acta Part A 58, 2002, pp. 2547-2555.

* cited by examiner

THIOPHENE AZO DYES AND LAUNDRY CARE COMPOSITIONS CONTAINING THE SAME

TECHNICAL FIELD

This application relates to thiophene azo dyes for use as hueing agents, laundry care compositions comprising such thiophene azo dyes, processes for making such thiophene azo dyes and laundry care compositions and methods of using the same. The aforementioned thiophene azo dyes contain a formally charged moiety and are generally comprised of at least two components: at least one chromophore component and at least one polymeric component. Suitable chromophore components generally fluoresce blue, red, violet, or purple color when exposed to ultraviolet light, or they may absorb light to reflect these same shades. These thiophene azo dyes are advantageous in providing a hueing effect, for example, a whitening effect to fabrics, while not building up over time and causing undesirable blue discoloration to the treated fabrics. The thiophene azo dyes are also generally stable to bleaching agents used in laundry care compositions.

BACKGROUND

As textile substrates age, their color tends to fade or yellow due to exposure to light, air, soil, and natural degradation of the fibers that comprise the substrates. Thus, the purpose of hueing agents is generally to visually brighten these textile substrates and counteract the fading and yellowing of the substrates. Typically, hueing agents may be found in laundry detergents, fabric softeners, or rinse aids and are therefore applied to textile substrates during the laundering process. However, it is important that hueing agents function to visually brighten treated textile substrates without causing undesirable staining of the textile substrates. Cellulosic substrates, in particular, tend to exhibit a yellow hue after exposure to light, air, and/or soiling. This yellowness is often difficult to reverse by normal laundering procedures. As a result, there exists a need for improved hueing agents which are capable of eliminating the yellowness exhibited by ageing cellulosic substrates. By utilizing such improved hueing agents, the life of the textile substrates, such as clothing articles, table linens, etc., may be extended. Unfortunately, current hueing agents either do not provide a hueing benefit after a single treatment cycle and/or they build up to an undesirable level, thus overhueing the treated situs over multiple treatment cycles.

The hueing agents disclosed herein and the laundry care compositions comprising same offer advantages over previous efforts in this area, as, unlike previous thiophene azo hueing agents, the present hueing agents comprise a formally charged moiety that allows such hueing agents to provide enhanced deposition, removal and hue angle when used in compositions such as laundry care compositions. In addition to the enhanced deposition, removal and hue angle, the present hueing agents offer improved stability in wash environments that contain bleaching agents, for example bleach boosters. While not being bound by theory, Applicants believe that such enhanced stability is, at least in part, due to the improved partitioning behavior of such hueing agents. The aforementioned benefits are offered over a range of fabric types. In short, Applicants recognized the source of the current hueing deficiencies and herein provide the solution to such problem. The hueing compounds disclosed herein also absorb light at a wavelength appropriate to visually neutralize the yellowness of substrates, including textile substrates. These compounds function ideally as hueing agents for substrates, including textile substrates, and may be incorporated into laundry care compositions for use by consumers.

SUMMARY OF INVENTION

This application relates to thiophene azo dyes for use as hueing agents, laundry care compositions comprising such thiophene azo dyes that may serve as hueing agents, processes for making such thiophene azo dyes and laundry care compositions and methods of using the same. The aforementioned thiophene azo dyes contain a formally charged moiety and are generally comprised of at least two components: at least one chromophore component and at least one polymeric component. Suitable chromophore components generally fluoresce blue, red, violet, or purple color when exposed to ultraviolet light, or they may absorb light to reflect these same shades. These thiophene azo dyes are advantageous in providing a hueing effect, for example, a whitening effect to fabrics, while not building up over time and causing undesirable blue discoloration to the treated fabrics. The thiophene azo dyes are also generally stable to bleaching agents used in laundry care compositions.

DETAILED DESCRIPTION

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the terms "alkyl" and "alkyl capped" are intended to include $C_1$-$C_{18}$ alkyl groups, and in one aspect, $C_1$-$C_6$ alkyl groups.

As used herein, the term "aryl" is intended to include $C_3$-$C_{12}$ aryl groups.

As used herein, the term "arylalkyl" is intended to include $C_1$-$C_{18}$ alkyl groups and, in one aspect, $C_1$-$C_6$ alkyl groups.

As used herein, the term "formally charged moiety" means a moiety having at least one formal positive charge or at least one formal negative charge in aqueous solution at a pH in the range from 7 to 11.

The terms "ethylene oxide," "propylene oxide" and "butylene oxide" may be shown herein by their typical designation of "EO," "PO" and "BO," respectively.

As used herein, the term "laundry care composition" includes, unless otherwise indicated, granular, powder, liquid, gel, paste, unit dose bar form and/or flake type washing agents and/or fabric treatment compositions.

As used herein, the term "fabric treatment composition" includes, unless otherwise indicated, fabric softening compositions, fabric enhancing compositions, fabric freshening compositions and combinations there of. Such compositions may be, but need not be rinse added compositions.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the articles including "the", "a" and "an" when used in a claim, are understood to mean one or more of what is claimed or described.

As used herein, the terms "include", "includes" and "including" are meant to be non-limiting.

As used herein, the term "maximum extinction coefficient" is intended to describe the molar extinction coefficient at the maximum wavelength in the range of 400 nanometers to 750 nanometers.

As a consequence of their manufacturing process, the thiophene azo dyes disclosed herein may contain a distribution of repeating units in their polymeric moiety. Accordingly, in one aspect, the molecular weight of the thiophene azo dyes disclosed herein may be reported as an average molecular weight, as determined by its molecular weight distribution.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Laundry Care Composition Comprising Suitable Hueing Agents

In one aspect, a laundry care composition comprising a hueing agent and one or more laundry care ingredients is disclosed. Suitable hueing agents include all the hueing agents listed below.

The hueing agents of the present invention include thiophene azo dyes which contain a formally charged moiety. However, these thiophene azo dyes do not comprise a meta-bis(2-hydroxy-3-trimethylammonium propyl) amino tolyl group.

In one aspect, the aforementioned thiophene azo dyes comprise a thiophene moiety, an azo moiety and a coupler moiety, said thiophene moiety being covalently bound to said azo moiety and said coupler being covalently bound to said azo moiety, at least one of said thiophene and/or azo moieties comprising a formally charged moiety.

The hueing agents of the present invention may be dyes, pigments, or polymeric colorants generally comprising a chromophore constituent and a polymeric constituent. The chromophore constituent is characterized in that it emits or absorbs wavelength in the range of blue, red, violet, purple, or combinations thereof upon exposure to light. In one aspect, the chromophore constituent exhibits an absorbance spectrum maximum in the wavelength range of about 400 nanometers to about 750 nanometers, in another aspect of about 520 nanometers to about 650 nanometers, in yet another aspect of about 540 nanometers to about 630 nanometers, in another aspect of about 560 nanometers to about 610 nanometers, in another aspect of about 565 nanometers to about 580 nanometers in methanol solution.

Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

In one aspect of the invention, the thiophene azo dye contains a formally charged moiety, with the proviso that the dye does not comprise a meta-bis(2-hydroxy-3-trimethylammoniumpropyl) amino tolyl group. The thiophene azo dye exhibits, in the wavelength range of about 400 nm to about 750 nm in methanol solution, or of about 520 nm to about 650 nm in methanol solution, or of about 540 nm to about 630 nm in methanol solution, or of about 560 nm to about 610 nm in methanol solution, or of about 565 nm to about 580 nm in methanol solution, a maximum extinction coefficient from about 1000 to about 1,000,000 liter/mol/cm, or from about 5,000 to about 750,000 liter/mol/cm, or from about 10,000 to about 500,000 liter/mol/cm, or from about 20,000 to about 250,000 liter/mol/cm. The thiophene azo dye exhibits a molecular weight from greater than 300 daltons, or from about 300 daltons to about 5000 daltons, or from about 350 daltons to about 3000 daltons, or from about 400 daltons to about 1500 daltons. The thiophene azo dye exhibits an aqueous partition value from about 10% to 100% or from about 20% to 100% or from about 30% to 100% or from about 40% to 100%, said dye comprising a non-covalently bound charge balancing counterion. The thiophene azo dye further exhibits an aqueous partition value from 0% to about 40%, from 0% to about 30%, from 0% to about 20%, or from about 1% to about 10%, said dye comprising a covalently bound charge balancing counterion.

The thiophene azo dye of the present invention may be represented by general Formula (I):

Formula 1

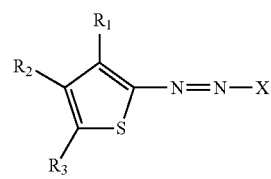

wherein:
a.) $R_1$, $R_2$ and $R_3$ are each independently selected from hydrogen, electron-withdrawing moieties, and electron-donating moieties, provided that at least one of $R_1$, $R_2$ and $R_3$ is an electron-withdrawing moiety; in another aspect, $R_1$ is an electron-withdrawing moiety; in yet another aspect, $R_1$ and $R_3$ are electron-withdrawing moieties; and
b.) wherein X is an organic moiety having a molecular weight from about 65 daltons to about 4855 daltons, or from about 150 daltons to about 2855 daltons, or from about 193 daltons to about 1355 daltons, or from about 300 daltons to about 855 daltons, or from about 400 daltons to about 600 daltons, or from about 420 daltons to about 575 daltons.

In yet another aspect of the thiophene azo dye, each $R_1$, $R_2$ and $R_3$ may be independently selected from hydrogen, ($C_1$-$C_4$)-alkyl, ($C_3$-$C_{10}$)-aryl, carboxylate, cyano, sulfonate, phosphonate, sulfate, acetate, nitro, ($C_1$-$C_4$)-alkyl ester, halogen or amino moiety, or each $R_1$, $R_2$ and $R_3$ may be independently selected from hydrogen, nitro, cyano, ($C_1$-$C_4$)-alkyl ester or ($C_1$-$C_4$)-alkyl.

In a further aspect of the thiophene azo dye, the X may be a moiety having Formula (II) below:

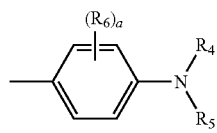

Formula II wherein:
i.) $R_4$ is selected from a moiety having Formula (III) below

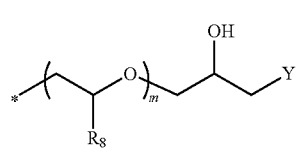

Formula III wherein:
i.) Each $R_8$ is independently selected from hydrogen, $C_1$-$C_8$ alkyl optionally substituted with a hydroxy, or acetyl;
ii.) m is an integer from 0 to 10;
iii.) Y is selected from a sulfonate, carboxylate, a phosphonate or quaternary ammonium species selected from an imidazolium, pyridinium, morpholinium, piperidinium, or a moiety having Formula (IV) below:

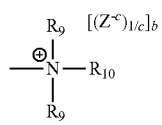

Formula IV wherein:
i.) $R_9$ is a $C_1$-$C_8$ alkyl moiety optionally substituted with —OH,
ii.) $R_{10}$ is selected from $C_1$-$C_{18}$ alkyl moiety optionally substituted with —OH, or $C_2$-$C_8$ alkyl substituted with sulfonate, or $C_1$-$C_8$ alkyl substituted with carboxylate,
iii.) Z is a charge balancing counterion of unit charge c; the index b is 1 when $R_{10}$ is a $C_1$-$C_{18}$ alkyl moiety optionally substituted with —OH, otherwise the index b=0;

Or, $R_4$ is selected from a moiety having Formula (V) below:

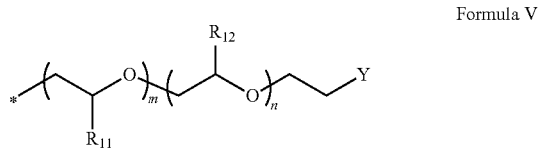

Formula V wherein
i.) Each $R_{11}$ and $R_{12}$ is independently selected from hydrogen, $C_1$-$C_8$ alkyl, aryl, acetyl or hydroxyl moiety; m and n are independent and are integers from 0 to 10,
ii.) Y is as described above;

Or, $R_4$ is selected from a moiety having Formula (VI) below:

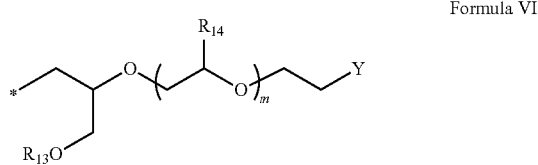

Formula VI wherein
i.) $R_{13}$ is selected from an aryl moiety, arylalkyl moiety such as a benzyl moiety, $C_1$-$C_{18}$ alkyl moiety, or a siloxane moiety;
ii.) Each $R_{14}$ is independently selected from hydrogen, $C_1$-$C_4$ alkyl; m is an integer from 0 to 10; and
iii.) Y is as described above;
ii.) $R_5$ can be the same as $R_4$ or selected from $C_1$-$C_{12}$ alkyl moiety, aryl moiety or arylalkyl moiety such as a benzyl moiety; wherein the index a is an integer from 0 to 4, or from 0 to 3, or from 0 to 2, and each $R_6$ may be independently selected from a $C_1$-$C_6$ alkyl, a $C_1$-$C_4$ alkoxy, a nitro, a hydroxyl, a halogen, or —NHC(O)$R_{22}$ wherein $R_{22}$ is selected from H, —NH$_2$, $C_1$-$C_6$ alkyl, phenyl, —(CH$_2$)$_s$O$R_{23}$ where the index s is 1 or 2 and $R_{23}$ is selected from Me, phenyl, and —CO$_2$CH$_2$CN; —NHSO$_2$R$_{24}$ wherein $R_{24}$ is $C_1$-$C_4$ alkyl or phenyl; said alkyl, alkoxy and acetamido moieties may be optionally substituted with a formally charged moiety;

Or, X is a moiety having Formula VII below:

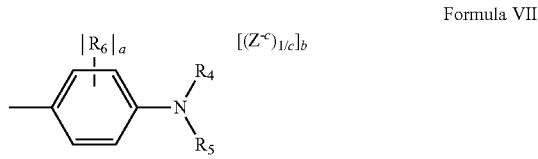

Formula VII wherein each $R_4$ and $R_5$ can independently be selected from:
a) [(CH$_2$CR'HO)$_x$(CH$_2$CR"HO)$_y$R$_{15}$];
b) alkyl, aryl or aryl alkyl;
c) [CH$_2$CH(OR$_{16}$)CH$_2$OR$_{17}$];
d) the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units wherein at least one such alkyleneoxide unit is substituted with $R_{15}$ that is not —H;

wherein R' is selected from the group consisting of H, $CH_3$, $CH_2O(CH_2CH_2O)_zR_{15}$, and mixtures thereof; R" is selected from the group consisting of H, $CH_2O(CH_2CH_2O)_zR_{15}$, and mixtures thereof; $x+y \leq 20$; $y \geq 1$; $z=0$ to 10; each $R_{15}$ is independently selected from —H and —$CH_2CHR_{18}N^+R_{19}R_{20}R_{21}$ wherein $R_{18}$ is selected from —H and —$CH_3$; each $R_{19}$ and $R_{20}$ is independently selected from $C_1$-$C_4$ alkyl optionally substituted with —OH; $R_{21}$ is independently selected from $C_1$-$C_{12}$ optionally —OH substituted alkyl or $(CH_2)_rO_pQ$; the index r is an integer from 1 to 8; the index p is 0 or 1; and wherein Q is an anionic group selected from —$CO_2^-$, and —$SO_3^-$; $R_{16}$ is selected from the group consisting of H, $(CH_2CH_2O)_zR_{15}$ wherein $z=0$ to 10, and mixtures thereof; $R_{17}$ is selected from the group consisting of $C_1$-$C_{16}$ alkyl, $C_6$-$C_{10}$ aryl groups, and mixtures thereof; the index m is an integer from 0 to 4 and each $R_6$ is as defined above; Z is a charge balancing counterion of unit charge c; the index b is equal to the number of non-H $R_{15}$ groups that do not comprise a covalently bound charge balancing counterion; further provided the molecule contains at least one non-H $R_{15}$ group.

In a further aspect of the thiophene azo dye, X may be a moiety having Formula (II) below:

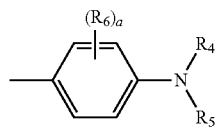

Formula II wherein:
i.) $R_4$ is selected from a moiety having Formula (III) below

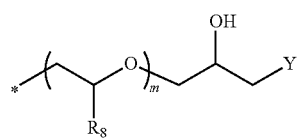

Formula III wherein:
i.) $R_8$ is a hydrogen, $C_1$-$C_4$ alkyl moiety or aryl moiety;
ii.) Y is a quaternary ammonium species selected from a group consisting of an imidazolium, or a moiety having Formula (IV) below:

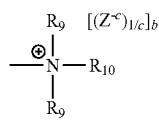

Formula IV wherein:
i.) $R_9$ is a $C_1$-$C_2$ alkyl moiety,
ii.) $R_{10}$ is selected from $C_1$-$C_8$ alkyl moiety optionally substituted with —OH, or $C_2$-$C_4$ alkyl substituted with sulfonate, or $C_1$-$C_4$ alkyl substituted with carboxylate,
iii.) Z is a charge balancing counterion of unit charge c; the index b is 1 when $R_{10}$ is a $C_1$-$C_8$ alkyl moiety optionally substituted with —OH, otherwise the index b=0;

Or, $R_4$ is selected from a moiety having Formula (V) below:

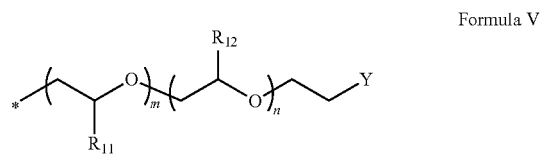

Formula V wherein
i.) Each $R_{11}$ and $R_{12}$ is independently selected from hydrogen, $C_1$-$C_4$ alkyl or aryl moiety; m and n are independent and are integers from 0 to 5,
ii.) Y is as described above,
Or, $R_4$ is selected from a moiety having Formula (VI) below:

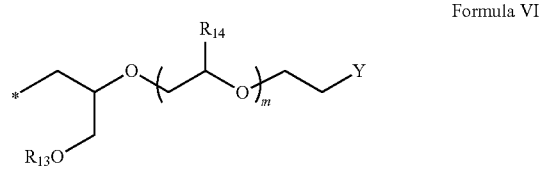

Formula VI wherein
i.) $R_{13}$ is selected from an aryl moiety, benzyl moiety, or a $C_1$-$C_{18}$ alkyl moiety;
ii.) Each $R_{14}$ is independently selected from hydrogen or —$CH_3$; m is an integer from 0 to 10,
ii.) $R_5$ can be the same as $R_4$ or selected from $C_1$-$C_6$ alkyl moiety or benzyl moiety;
iii.) Wherein the index a is an integer from 0 to 2, and each $R_6$ may be independently selected from methyl, methoxy, or acetamido moiety.

In one aspect of the thiophene azo dye of the present invention, each $R_1$, $R_2$ and $R_3$ may be independently selected from hydrogen, $(C_1$-$C_4)$-alkyl, $(C_3$-$C_{10})$-aryl, carboxylate, cyano, sulfonate, phosphonate, sulfate, acetate, nitro, $(C_1$-$C_4)$-alkyl ester, halogen or amino moiety, or each $R_1$, $R_2$ and $R_3$ may be independently selected from hydrogen, nitro, cyano, $(C_1$-$C_4)$-alkyl ester or $(C_1$-$C_4)$-alkyl.

In yet a further aspect, the thiophene azo dye of the present invention may be represented by Formula (VIII):

A—N=N—X                                        Formula VIII wherein the A moiety is selected from the group consisting of Table 1 A Moieties Nos. 1-118, or Table 1 A Moieties Nos. 6-11, 15, 21-23, 30-31, 33-39, 41, 43, 46-48, 50-55, 57-58, 64-65, 70-73, 77-78, 82-86, 88-90, 93-95, 99-100, 104-106, and 110-118, or Table 1 A Moieties Nos. 9-11, 15, 23, 34-35, 37-39, 41, 43, 47, 50-51, 57-58, 77, 83, 89, 95, 106, and 110-118; and wherein the X moiety is selected from the group consisting of Table 4 X Moieties Nos. 1-31.

In yet another aspect, the thiophene azo dye of the present invention may be represented by the following formula:

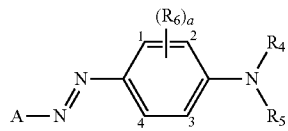

wherein the moiety A is selected from Table 1 A Moieties Nos. 1-118, or from Table 1 A Moieties Nos. 6-11, 15, 21-23, 30-31, 33-39, 41, 43, 46-48, 50-55, 57-58, 64-65, 70-73, 77-78, 82-86, 88-90, 93-95, 99-100, 104-106, and 110-118, or from Table 1 A Moieties Nos. 9-11, 15, 23, 34-35, 37-39, 41, 43, 47, 50-51, 57-58, 77, 83, 89, 95, 106, and 110-118; a=0 to 2; when a=1 or 2, $R_6$ is selected from Table 2 $R_6$ Substituent Identity and Position Nos. 1-40, or from Table 2 $R_6$ Substituent Identity and Position Nos. 1, 3, 5, 7-9, 11-14, 21, 23-24, 31, 33-34, 36 and 40, or from Table 2 $R_6$ Substituent Identity and Position Nos. 1, 3, 5, 7, 12, 13, 14, 31, 36 and 40; and $R_4$ and $R_5$ grouping is selected from Table 3 $R_4$ and $R_5$ Groupings Nos. 1-69, or from Table 3 $R_4$ and $R_5$ Groupings Nos. 3-6, 10, 13-14, 17-21, 23-24, 27-28, 31-35, 37-38, 41, 44-49, 51-52, 54-56, 58, 60-69, or from Table 3 $R_4$ and $R_5$ Groupings Nos. 3, 5-6, 10, 13-14, 17, 19-21, 24, 27-28, 31-34, 38, 41, 44-48, 52, 54-55, 58, 60-64 and 69.

A moieties may be selected from the moieties shown in Table 1:

TABLE 1

| A Moieties | |
|---|---|
| No. | A |
| 1 | 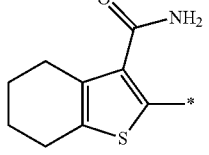 |
| 2 | 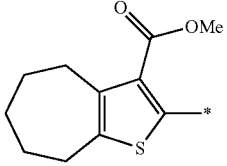 [SMILES: *c1sc2c(c1C(=O)OC)CCCCC2] |
| 3 | 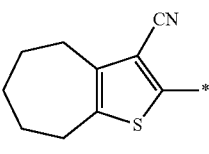 [SMILES: *c1sc2c(c1C#N)CCCCC2] |
| 4 | 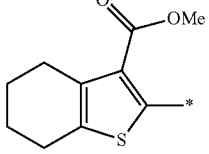 |

TABLE 1-continued

| A Moieties | |
|---|---|
| No. | A |
| 5 | 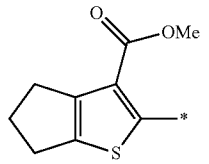 [SMILES: *c1sc2c(c1C(=O)OC)CCC2] |
| 6 | 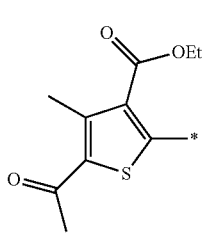 [SMILES: *c1sc(C(C)=O)c(C)c1C(=O)OCC] |
| 7 | 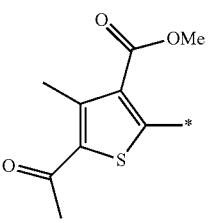 [SMILES: *c1sc(C(C)=O)c(C)c1C(=O)OC] |
| 8 | 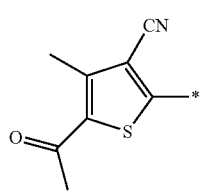 [SMILES: *c1sc(C(C)=O)c(C)c1C#N] |
| 9 | 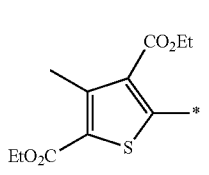 |
| 10 | 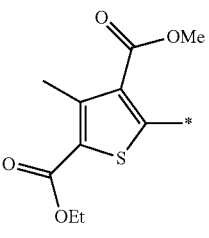 [SMILES: *c1sc(C(=O)OCC)c(C)c1C(=O)OC] |
| 11 | 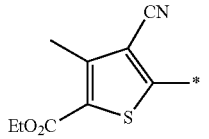 |

TABLE 1-continued

A Moieties

| No. | A |
|-----|---|
| 12 | (4-phenyl-thiophene-2-carboxylic acid methyl ester, attached at 5-position) |
| 13 | (4-phenyl-thiophene-2-carboxylic acid ethyl ester, attached at 5-position) |
| 14 | (benzo[b]thiophene-3-carboxylic acid ethyl ester, attached at 2-position) |
| 15 | (3,5-dinitrothiophene, attached at 2-position) |
| 16 | (2-(2-chlorobenzoyl)-3-ethylthiophene, attached at 5-position) |
| 17 | (3-cyano-4,5,6,7-tetrahydrobenzo[b]thiophene, attached at 2-position) |
| 18 | (4,5,6,7-tetrahydrobenzo[b]thiophene-3-carboxylic acid ethyl ester, attached at 2-position) |
| 19 | (thiophene-3,4-dicarboxylic acid diethyl ester, attached at 2-position) |
| 20 | (3-cyano-8H-indeno[1,2-b]thiophen-8-one, attached at 2-position) |
| 21 | (3-nitro-5-sulfothiophene, attached at 2-position) |
| 22 | (thiophene-2,4-dicarboxylic acid diethyl ester with 3-(ethoxycarbonylmethyl), attached at 5-position) |
| 23 | (2,4-dicyano-3-methylthiophene, attached at 5-position) |
| 24 | (3-acetylamino-thiophene-2-carboxylic acid methyl ester, attached at 5-position) |
| 25 | (5-benzyl-4,5,6,7-tetrahydro-thieno[3,2-c]pyridine-3-carboxylic acid ethyl ester, attached at 2-position) |
| 26 | (benzo[c]thiophene, attached at 1-position) |
| 27 | (benzo[b]thiophene, attached at 2-position) |
| 28 | (thiophene, attached at 2-position) |

TABLE 1-continued

A Moieties

| No. | A |
|---|---|
| 29 | thiophene with EtO-C(O)-CH2- at 3-position, CN at 4-position, Br at 5-position, * at 2-position |
| 30 | thiophene with NO2 at 3-position, MeS(O)2 at 5-position, * at 2-position |
| 31 | thiophene with NO2 at 3-position, Ac at 5-position, * at 2-position |
| 32 | thiophene with NO2 at 3-position, EtC(O) at 5-position, * at 2-position |
| 33 | thiophene with NO2 at 3-position, F3C-C(O) at 5-position, * at 2-position |
| 34 | thiophene with CN at 4-position, Me at 3-position, MeO-C(O) at 5-position, * at 2-position |
| 35 | thiophene with NO2 at 3-position, OHC at 5-position, * at 2-position |
| 36 | thiophene with NO2 at 3-position, iPr-C(O) at 5-position, * at 2-position |
| 37 | thiophene with EtO-C(O) at 3-position, NC at 5-position, * at 2-position |
| 38 | thiophene with CN at 3-position, EtO2C at 5-position, * at 2-position |
| 39 | thiophene with EtO-C(O) at 3-position, EtO-C(O) at 5-position, * at 2-position |
| 40 | thiophene with EtO-C(O) at 3-position, HO3S-CH2 at 4-position, EtO-C(O) at 5-position, * at 2-position |
| 41 | thiophene with CN at 3-position, O2N at 5-position, * at 2-position |
| 42 | thiophene with CN at 3-position, Cl at 4-position, OHC at 5-position, * at 2-position |
| 43 | thiophene with CN at 3-position, OHC at 5-position, * at 2-position |
| 44 | thiophene with Cl at 5-position, * at 2-position |
| 45 | thiophene with CN at 3-position, Cl at 4-position, * at 2-position |
| 46 | thiophene with CN at 3-position, MeO2C at 4-position, O2N at 5-position, * at 2-position |

TABLE 1-continued
A Moieties
| No. | A |
|---|---|
| 47 | 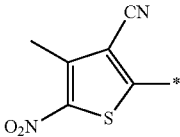 |
| 48 | 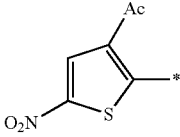 [SMILES: *c1sc([N+](=O)[O-])cc1C(C)=O] |
| 49 | 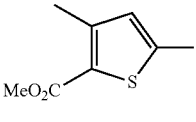 |
| 50 | 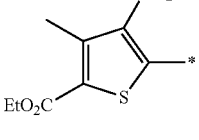 |
| 51 | 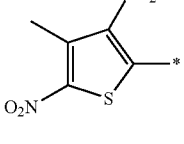 |
| 52 | 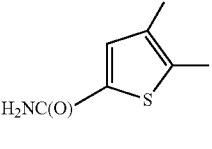 |
| 53 | 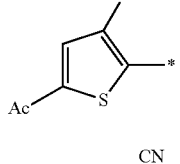 |
| 54 | 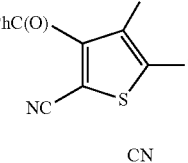 |
| 55 | 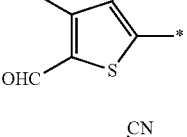 |
| 56 | 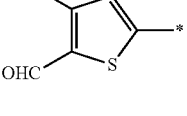 |
| 57 | 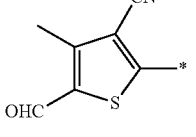 |
| 58 | 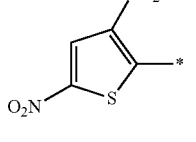 |
| 59 | 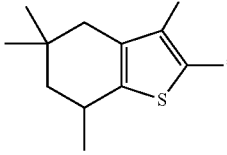 |
| 60 | 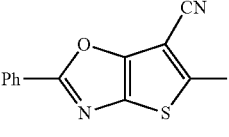 |
| 61 | 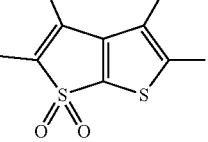 |
| 62 | 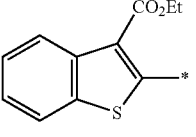 [SMILES: *c1sc2ccccc2c1C(=O)OCC] |
| 63 | 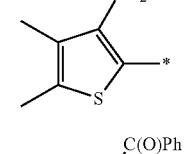 |
| 64 | 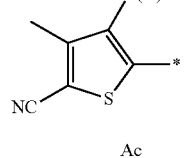 |
| 65 | 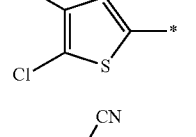 |
| 66 | 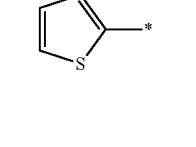 |

TABLE 1-continued

A Moieties

| No. | A |
|---|---|
| 67 | thiophene with CN, PhC(O)O, O₂N, * |
| 68 | thiophene with CN, EtO₂C, O₂N, * |
| 69 | thiophene with CN, Ph, O₂N, * |
| 70 | thiophene with CO₂H, Cl, O₂N, * |
| 71 | thiophene with CO₂Ph, O₂N, * |
| 72 | thiophene with C(O)Ph, O₂N, * |
| 73 | thiophene with OC(O)CH₂CH₂OEt, O₂N, * |
| 74 | thiophene with OC(O)n-Bu, O₂N, * |
| 75 | thiophene with OAc, O₂N, * |
| 76 | thiophene with OC(O)Et, O₂N, * |
| 77 | thiophene with CO₂Me, Me, MeO₂C, * |
| 78 | thiophene with CO₂H, Me, HO₂C, * |
| 79 | thiophene with CN, Cl, NC, * |
| 80 | thiophene with CN, Br, O₂N, * |
| 81 | thiophene with CN, MeS(O)₂, O₂N, * |
| 82 | thiophene with CN, Br, OHC, * |
| 83 | thiophene with NO₂, Cl, OHC, * |
| 84 | thiophene with C(O)n-Bu, O₂N, * |
| 85 | thiophene with C(O)Et, O₂N, * |
| 86 | thiophene with NO₂, FS(O)₂, * |

TABLE 1-continued
A Moieties
| No. | A |
|---|---|
| 87 | 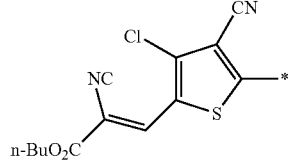 |
| 88 | 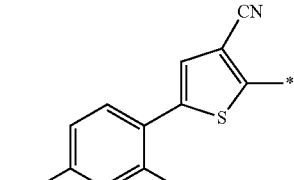 |
| 89 | 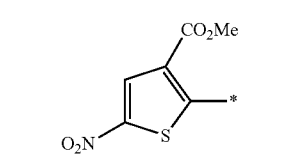 [SMILES: *c1sc([N+](=O)[O-])cc1C(=O)OC] |
| 90 | 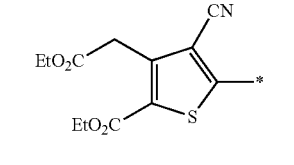 [SMILES: *c1sc(C(=O)OCC)c(CC(=O)OCC)c1C#N] |
| 91 | 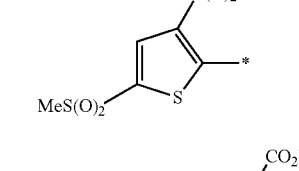 |
| 92 | 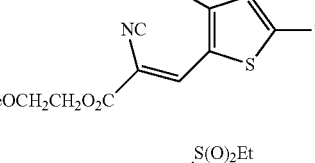 |
| 93 | 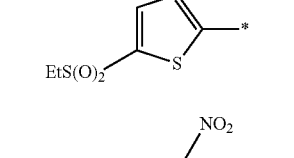 |
| 94 | 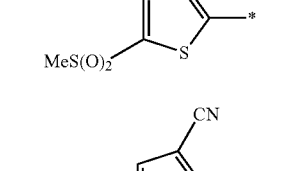 |
| 95 | 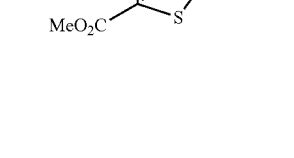 |
| 96 | 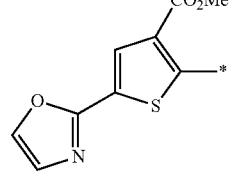 |
| 97 | 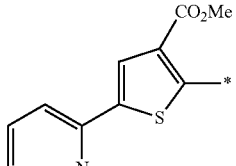 |
| 98 | 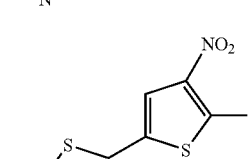 |
| 99 | 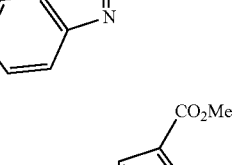 |
| 100 | 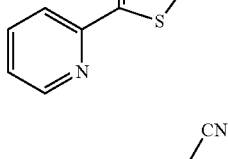 |
| 101 | 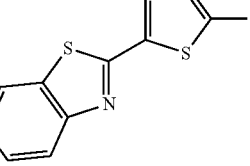 |
| 102 | 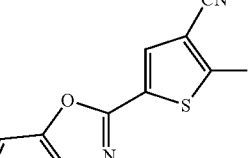 |

TABLE 1-continued

A Moieties

| No. | A |
|---|---|
| 103 | 2-(O₂N)-thiophen-5-yl with C(O)NHCH₂CH=CH₂ at 3-position |
| 104 | 2-(O₂N)-thiophen-5-yl with SCN at 3-position |
| 105 | 2-(O₂N)-thiophen-5-yl with Br at 3-position |
| 106 | 2-(O₂N)-thiophen-5-yl with CO₂Me at 3-position and Me at 4-position |
| 107 | thiophen-2-yl at 5-position with C(CH₃)=C(CN)(CO₂Me), and CO₂Me at 3-position |
| 108 | 5-(NC)-thiophen-2-yl |
| 109 | thiophen-2-yl with CO₂Me at 3-position, Me at 4-position, Me at 5-position |
| 110 | 2-(O₂N)-thiophen-5-yl with NO₂ at 3-position and Me at 4-position |
| 111 | thiophen-2-yl with CO₂Et at 3-position, CH₂SO₃H at 4-position, OHC at 5-position |
| 112 | thiophen-2-yl with CO₂Et at 3-position, CH₂SO₃H at 4-position, NC at 5-position |
| 113 | thiophen-2-yl with CN at 3-position, CH₂SO₃H at 4-position, OHC at 5-position |
| 114 | thiophen-2-yl with CN at 3-position, CH₂SO₃H at 4-position, NC at 5-position |
| 115 | thiophen-2-yl with C(O)NHEt at 3-position, CH₂SO₃H at 4-position, OHC at 5-position |
| 116 | thiophen-2-yl with C(O)NHEt at 3-position, CH₂SO₃H at 4-position, NC at 5-position |
| 117 | thiophen-2-yl with CO₂Me at 3-position, CH₂SO₃H at 4-position, OHC at 5-position |
| 118 | thiophen-2-yl with CO₂Me at 3-position, CH₂SO₃H at 4-position, NC at 5-position |

$R_6$ may be selected from the substituents shown in Table 2:

TABLE 2

$R_6$ Substituent-Identity and Position

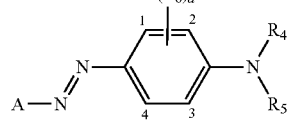

$R_6$ Substituent-Identity and Position on Aniline Ring

| No. | 1 | 2 | 3 | 4 |
|---|---|---|---|---|
| 1 | | | | —OH |
| 2 | | —Cl | | —OH |
| 3 | | —OMe | | —OH |
| 4 | | —On-Bu | | —OH |
| 5 | | | | —Me |
| 6 | | —Me | | —Me |
| 7 | | —OMe | | —Me |
| 8 | | —OEt | | —Me |
| 9 | | | | —Cl |
| 10 | | | | —Br |

TABLE 2-continued

R₆ Substituent-Identity and Position $$\text{A}-\text{N}=\text{N}-\underset{(R_6)_a}{\text{C}_6\text{H}_3}-\text{N}(R_4)(R_5)$$

(aniline ring positions: 1, 2 adjacent to azo-linked carbon; 3, 4 adjacent to amine-linked carbon)

R₆ Substituent-Identity and Position on Aniline Ring

| No. | 1 | 2 | 3 | 4 |
|-----|---|---|---|---|
| 11 | | | | —NO₂ |
| 12 | | | | —NH₂ |
| 13 | | | | —NHAc |
| 14 | | —OMe | | —NHAc |
| 15 | | | | —NHC(O)Et |
| 16 | | —OMe | | —NHC(O)Et |
| 17 | | —OEt | | —NHC(O)Et |
| 18 | | | | —NHC(O)n-Pr |
| 19 | | —Me | | —NHC(O)n-Pr |
| 20 | | | | —NHC(O)i-Pr |
| 21 | | | | —NHC(O)n-Bu |
| 22 | | —OMe | | —NHC(O)n-Bu |
| 23 | | | | —NHC(O)c-C₆H₁₁ |
| 24 | | | | —NHC(O)Ph |
| 25 | | —OMe | | —NHC(O)Ph |
| 26 | | | | —NHC(O)CH₂OMe |
| 27 | | | | —NHC(O)CH₂OPh |
| 28 | | | | —NHC(O)CH₂CH₂OMe |
| 29 | | | | —NHC(O)CH₂CH₂OEt |
| 30 | | | | —NHC(O)(CH₂)₂CO₂CH₂CN |
| 31 | | | | —NHC(O)NH₂ |
| 32 | | | | —NHSO₂Me |
| 33 | | | | —NHSO₂Et |
| 34 | | —OMe | | —NHSO₂Et |
| 35 | | | | —NHSO₂Ph |
| 36 | | —OMe | | |
| 37 | | —Me | | |
| 38 | | —Cl | | |
| 39 | | —NO₂ | | |
| 40 | | —OMe | | —OMe |

R₄ and R₅ groupings may be selected from the groupings shown in Table 3:

TABLE 3

R₄ and R₅ Groupings

| No. | R₄ | R₅ |
|-----|----|----|
| 1 | Ethyl | Z⁻ ⊕N(Et)₂–CH₂CH₂–O–CH₂CH₂–* (triethylammonium ethoxyethyl) |
| 2 | Ethyl | Z⁻ ⊕(N-methylimidazolium)–CH₂CH₂–O–CH₂CH₂–* |
| 3 | Ethyl | Z⁻ ⊕N(Et)₃–CH₂CH₂–O–CH₂CH₂–O–CH₂CH₂–O–CH₂CH₂–O–CH₂CH₂–* |

TABLE 3-continued

R$_4$ and R$_5$ Groupings

| No. | R$_4$ | R$_5$ |
|-----|-------|-------|
| 4 | Ethyl | 3-methylimidazolium-1-yl-ethyl-O-(CH$_2$CH$_2$O)$_3$-CH$_2$CH$_2$-* , Z$^-$ |
| 5 | Ethyl | $^-$O$_2$C-CH$_2$CH$_2$-N$^+$(CH$_3$)$_2$-CH$_2$CH$_2$-O-(CH$_2$CH$_2$O)$_3$-CH$_2$CH$_2$-* |
| 6 | Ethyl | $^-$O$_3$S-(CH$_2$)$_3$-N$^+$(Et)$_2$-CH$_2$CH$_2$-O-(CH$_2$CH$_2$O)$_3$-CH$_2$CH$_2$-* , Z$^-$ |
| 7 | Ethyl | $^-$O$_3$S-(CH$_2$)$_4$-N$^+$(CH$_3$)$_2$-CH$_2$CH$_2$-O-(CH$_2$CH$_2$O)$_3$-CH$_2$CH$_2$-* |
| 8 | Ethyl | (CH$_3$)$_3$N$^+$-CH$_2$CH$_2$-O-CH$_2$CH$_2$-O-CH$_2$-CH(CH$_2$-O-iPr)-CH$_2$-* , Z$^-$ |
| 9 | Ethyl | $^-$O$_3$S-(CH$_2$)$_3$-N$^+$(CH$_3$)$_2$-CH$_2$CH$_2$-O-CH$_2$CH$_2$-O-CH(CH$_2$-O-iPr)-CH$_2$-* |

TABLE 3-continued
| | R₄ and R₅ Groupings | |
|---|---|---|
| No. | R₄ | R₅ |
| 10 | Ethyl | 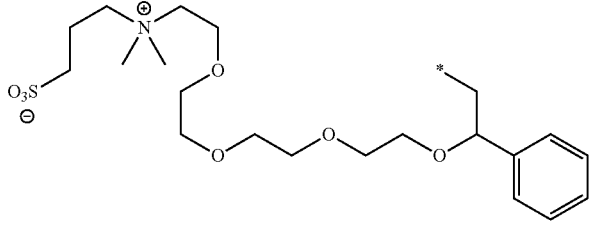 |
| 11 | Ethyl | 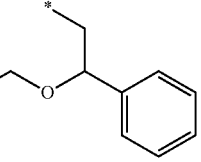 |
| 12 | Ethyl | 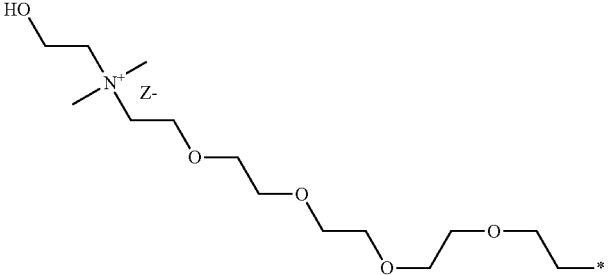 [SMILES: *CCOCCOCCOCCOCC[N+](C)(C)CCO] |
| 13 | Ethyl | 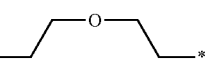 |
| 14 | Ethyl | 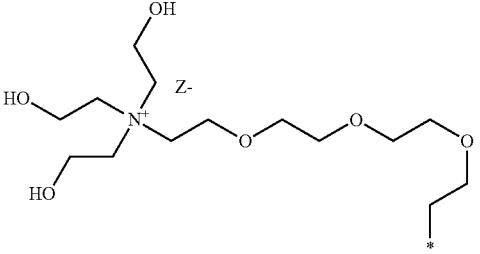 [SMILES: *CCOCCOCCOCC[N+](CCO)(CCO)CCO] |
| 15 | Benzyl |  |

TABLE 3-continued

R₄ and R₅ Groupings

| No. | R₄ | R₅ |
|---|---|---|
| 16 | Benzyl | 1-methylimidazolium-3-yl-ethyl-O-CH₂CH₂-* (Z⁻) |
| 17 | Benzyl | triethylammonium-CH₂CH₂-(OCH₂CH₂)₃-O-CH₂CH₂-* (Z⁻) |
| 18 | Benzyl | 3-methylimidazolium-1-yl-CH₂CH₂-(OCH₂CH₂)₃-O-CH₂CH₂-* (Z⁻) |
| 19 | Benzyl | ⁻O₂C-CH₂CH₂-N⁺(CH₃)₂-CH₂CH₂-(OCH₂CH₂)₃-O-CH₂CH₂-* |
| 20 | Benzyl | ⁻O₃S-CH₂CH₂CH₂-N⁺(Et)₂-CH₂CH₂-(OCH₂CH₂)₃-O-CH₂CH₂-* |
| 21 | Benzyl | (⁻O₃S-CH₂CH₂CH₂CH₂-)N⁺(CH₃)₂-CH₂CH₂-(OCH₂CH₂)₃-O-CH₂CH₂-* |

TABLE 3-continued

| | R4 and R5 Groupings | |
|---|---|---|
| No. | R4 | R5 |
| 22 | Benzyl | (structure: quaternary ammonium with two methyls, Z⁻ counterion, linked via ethyleneoxy-ethyleneoxy chain to a CH with isopropoxy branch and CH2* attachment) |
| 23 | Benzyl | (structure: sulfopropyl betaine $^{-}O_3S$-(CH2)3-N⁺(CH3)2-CH2CH2-O-CH2CH2-O-CH(CH2*)-O-iPr) |
| 24 | Benzyl | (structure: $^{-}O_3S$-(CH2)3-N⁺(CH3)2-CH2CH2-O-CH2CH2-O-CH2CH2-O-CH2CH2-O-CH(Ph)-CH2*) |
| 25 | Benzyl | (structure: HO-CH2CH2-N⁺(CH3)2-CH2CH2-O-CH2CH2-O-CH2CH2-O-CH2CH2*, Z⁻) |
| 26 | Benzyl | (structure: tris(2-hydroxyethyl)ammonium N⁺ with -CH2CH2-O-CH2CH2-O-CH2CH2-O-CH2CH2* tether, Z⁻) |

TABLE 3-continued

| | R$_4$ and R$_5$ Groupings | |
|---|---|---|
| No. | R$_4$ | R$_5$ |
| 27 | Benzyl | Me$_2$N$^+$(CH$_2$CO$_2^-$)CH$_2$CH$_2$(OCH$_2$CH$_2$)$_3$O-* |
| 28 | Benzyl | HOOC-CH$_2$CH$_2$-CH(NH$_3^+$)-COO$^-$ linked via -CH$_2$CH$_2$-O-* |
| 29 | Hexyl | Et$_3$N$^+$-CH$_2$CH$_2$-O-*    Z$^-$ |
| 30 | Hexyl | 3-methylimidazolium-CH$_2$CH$_2$-O-*    Z$^-$ |
| 31 | Hexyl | Et$_3$N$^+$-CH$_2$CH$_2$(OCH$_2$CH$_2$)$_3$O-*    Z$^-$ |
| 32 | Hexyl | 3-methylimidazolium-CH$_2$CH$_2$(OCH$_2$CH$_2$)$_3$O-*    Z$^-$ |

TABLE 3-continued

R$_4$ and R$_5$ Groupings

| No. | R$_4$ | R$_5$ |
|---|---|---|
| 33 | Hexyl | (structure: $^{\ominus}O_2C$–CH$_2$CH$_2$–N$^{\oplus}$(CH$_3$)$_2$–CH$_2$CH$_2$–O–CH$_2$CH$_2$–O–CH$_2$CH$_2$–O–CH$_2$CH$_2$–O–CH$_2$CH$_2$–*) |
| 34 | Hexyl | (structure: $^{\ominus}O_3S$–(CH$_2$)$_3$–N$^{\oplus}$(Et)$_2$–CH$_2$CH$_2$–O–CH$_2$CH$_2$–O–CH$_2$CH$_2$–O–CH$_2$CH$_2$–O–CH$_2$CH$_2$–*) |
| 35 | Hexyl | (structure: $^{\ominus}O_3S$–(CH$_2$)$_3$–N$^{\oplus}$(CH$_3$)$_2$–CH$_2$CH$_2$–O–CH$_2$CH$_2$–O–CH$_2$CH$_2$–O–CH$_2$CH$_2$–O–CH$_2$CH$_2$–*) |
| 36 | Hexyl | (structure: Z$^-$ N$^{\oplus}$(CH$_3$)$_2$–CH$_2$CH$_2$–O–CH$_2$CH$_2$–O–CH(CH$_2$–O–iPr)–CH$_2$–*, with additional O ring) |
| 37 | Hexyl | (structure: $^{\ominus}O_3S$–(CH$_2$)$_3$–N$^{\oplus}$(CH$_3$)$_2$–CH$_2$CH$_2$–O–CH$_2$CH$_2$–O–CH(CH$_2$–O–iPr)–CH$_2$–*) |
| 38 | Hexyl | (structure: $^{\ominus}O_3S$–(CH$_2$)$_3$–N$^{\oplus}$(CH$_3$)$_2$–CH$_2$CH$_2$–O–CH$_2$CH$_2$–O–CH$_2$CH$_2$–O–CH$_2$CH(Ph)–CH$_2$–*) |

TABLE 3-continued
| | $R_4$ and $R_5$ Groupings | |
|---|---|---|
| No. | $R_4$ | $R_5$ |
| 39 | Hexyl | 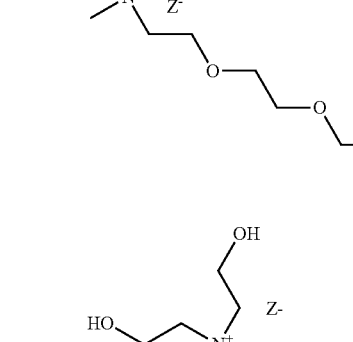 |
| 40 | Hexyl | 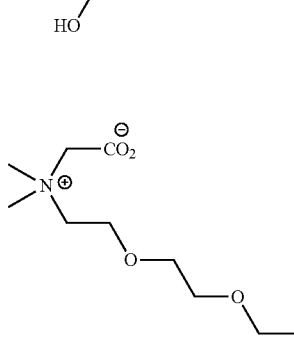 |
| 41 | Hexyl | 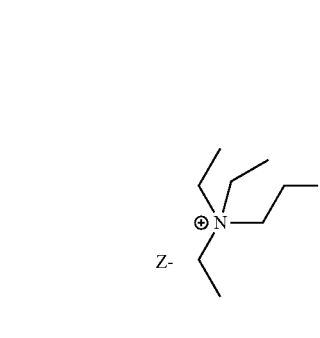 |
| 42 | Isopropyl | 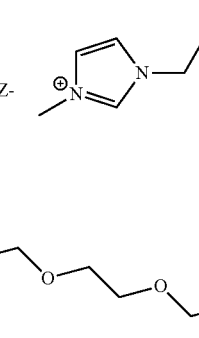 |
| 43 | Isopropyl | 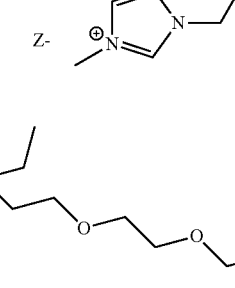 |
| 44 | Isopropyl | 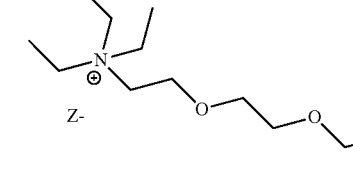 |

TABLE 3-continued

| | R$_4$ and R$_5$ Groupings | |
|---|---|---|
| No. | R$_4$ | R$_5$ |
| 45 | Isopropyl | N-methylimidazolium group connected via -CH$_2$CH$_2$-(OCH$_2$CH$_2$)$_4$-* with Z$^-$ counterion |
| 46 | Isopropyl | $^\ominus$O$_2$C-CH$_2$CH$_2$-N$^\oplus$(CH$_3$)$_2$-CH$_2$CH$_2$-(OCH$_2$CH$_2$)$_4$-* |
| 47 | Isopropyl | $^\ominus$O$_2$C-CH$_2$-N$^\oplus$(CH$_3$)$_2$-CH$_2$CH$_2$-(OCH$_2$CH$_2$)$_4$-* |
| 48 | Isopropyl | $^\ominus$O$_3$S-CH$_2$CH$_2$CH$_2$-N$^\oplus$(CH$_2$CH$_3$)$_2$-CH$_2$CH$_2$-(OCH$_2$CH$_2$)$_4$-* |
| 49 | Isopropyl | $^\ominus$O$_3$S-CH$_2$CH$_2$CH$_2$CH$_2$-N$^\oplus$(CH$_3$)$_2$-CH$_2$CH$_2$-(OCH$_2$CH$_2$)$_4$-* |

TABLE 3-continued

R₄ and R₅ Groupings

| No. | R₄ | R₅ |
|---|---|---|
| 50 | Isopropyl | (structure) |
| 51 | Isopropyl | (structure) |
| 52 | Isopropyl | (structure) |
| 53 | Isopropyl | (structure) |
| 54 | Isopropyl | (structure) |
| 55 | (structure) | (structure) |

TABLE 3-continued
R₄ and R₅ Groupings
| No. | R₄ | R₅ |
|---|---|---|
| 56 | 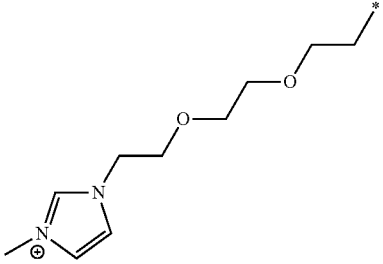 | 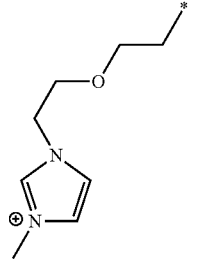 |
| 57 | 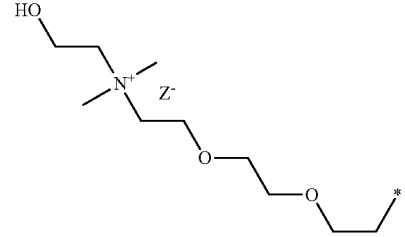 [SMILES: *CCOCCOCC[N+](C)(C)CCO] | 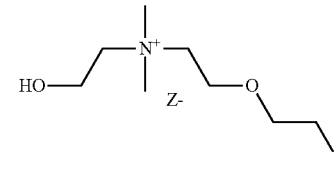 |
| 58 | 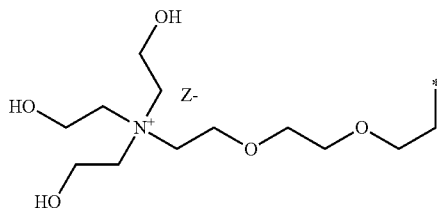 [SMILES: *CCOCCOCC[N+](CCO)(CCO)CCO] | 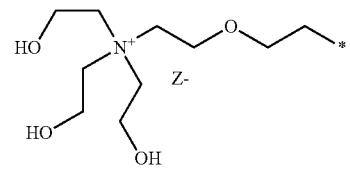 [SMILES: *CCOCC[N+](CCO)(CCO)CCO] |
| 59 | 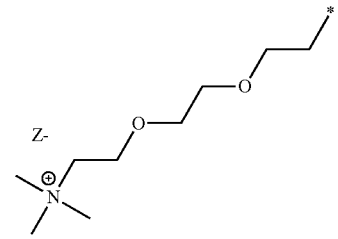 [SMILES: *CCOCCOCC[N+](C)(C)C] | 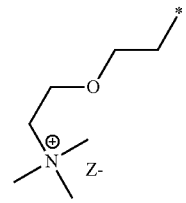 [SMILES: *CCOCC[N+](C)(C)C] |
| 60 | 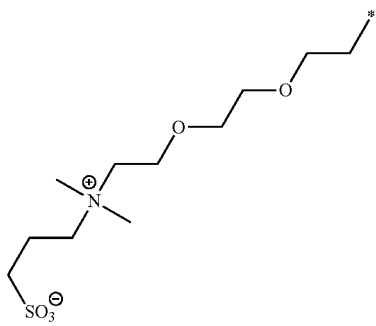 | 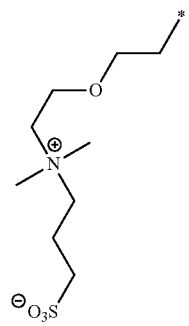 |
| 61 | 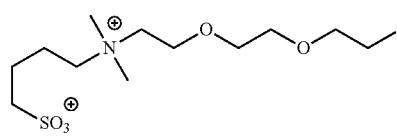 | 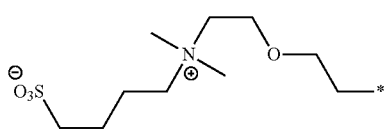 |

TABLE 3-continued

R$_4$ and R$_5$ Groupings

| No. | R$_4$ | R$_5$ |
|---|---|---|
| 62 | [structure: $^-O_2C$–CH$_2$CH$_2$–N$^+$(CH$_3$)$_2$–CH$_2$CH$_2$–O–CH$_2$CH$_2$–O–CH$_2$CH$_2$–*] | [structure: $^-O_2C$–CH$_2$CH$_2$–N$^+$(CH$_3$)$_2$–CH$_2$CH$_2$–O–CH$_2$CH$_2$–*] |
| 63 | [structure: $^-O_2C$–CH$_2$–N$^+$(CH$_3$)$_2$–CH$_2$CH$_2$–O–CH$_2$CH$_2$–O–CH$_2$CH$_2$–*] | [structure: $^-O_2C$–CH$_2$–N$^+$(CH$_3$)$_2$–CH$_2$CH$_2$–O–CH$_2$CH$_2$–*] |
| 64 | [structure: glutamate with H$_2$N$^+$–CH$_2$CH$_2$–O–CH$_2$CH$_2$–*] | [structure: glutamate with H$_2$N$^+$–CH$_2$CH$_2$–O–CH$_2$CH$_2$–*] |
| 65 | Ethyl | Z$^+$ $^-O_3S$–O–CH$_2$CH$_2$–O–CH$_2$CH$_2$–O–CH$_2$CH$_2$–O–CH$_2$CH$_2$–* |
| 66 | Benzyl | Z$^+$ $^-O_3S$–O–CH$_2$CH$_2$–O–CH$_2$CH$_2$–O–CH$_2$CH$_2$–O–CH$_2$CH$_2$–* |
| 67 | Isopropyl | Z$^+$ $^-O_3S$–O–CH$_2$CH$_2$–O–CH$_2$CH$_2$–O–CH$_2$CH$_2$–O–CH$_2$CH$_2$–* |
| 68 | Z$^+$ $^-O_3S$–O–CH$_2$CH$_2$–O–CH$_2$CH$_2$–O–CH$_2$CH$_2$–* | Z$^+$ $^-O_3S$–O–CH$_2$CH$_2$–O–CH$_2$CH$_2$–* |
| 69 | Z$^+$ $^-SO_3$–CH$_2$CH$_2$–O–CH$_2$CH$_2$–O–CH$_2$CH$_2$–* | Z$^+$ $^-SO_3$–CH$_2$CH$_2$–O–CH$_2$CH$_2$–* |

The "*" denotes point of attachment to additional moieties.
"Z" denotes the appropriate charge balancing counterion.

X moieties may be selected from the moieties shown in Table 4:
TABLE 4
X Moieties
| No. | Z = O-Tosylate or Halogen |
|---|---|
| 1 | 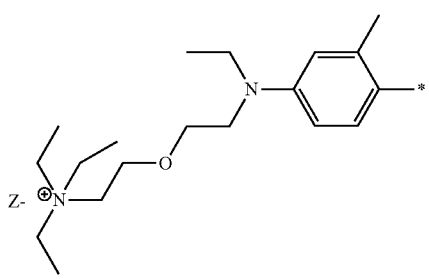 |
| 2 | 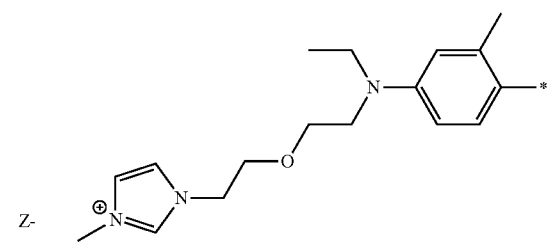 |
| 3 | 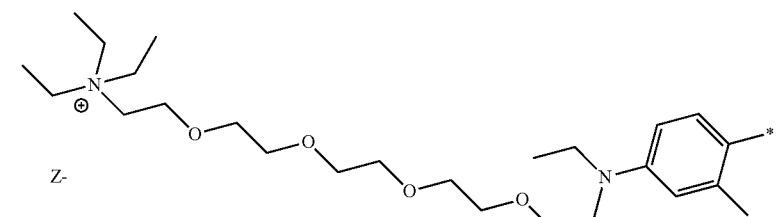 |
| 4 | 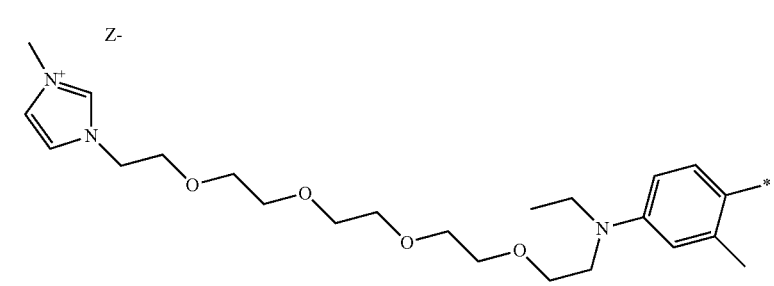 |
| 5 | 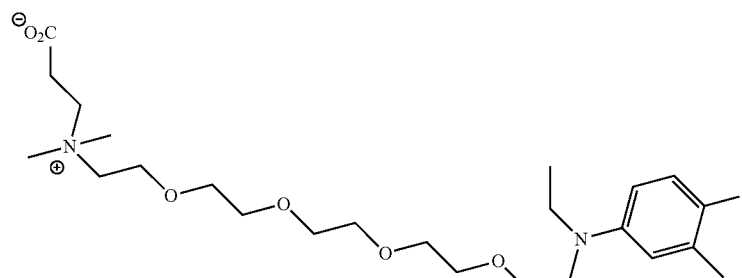 |

TABLE 4-continued

| X Moieties | |
|---|---|
| No. | Z = O-Tosylate or Halogen |

6–10: (chemical structures)

TABLE 4-continued

| X Moieties |
|---|
| No. | Z = O-Tosylate or Halogen |

11

12

13

14

TABLE 4-continued

| | X Moieties |
|---|---|
| No. | Z = O-Tosylate or Halogen |

15 [Chemical structure]

16 [Chemical structure]

17 [Chemical structure]

18 [Chemical structure]

TABLE 4-continued
| | X Moieties |
|---|---|
| No. | Z = O-Tosylate or Halogen |
19
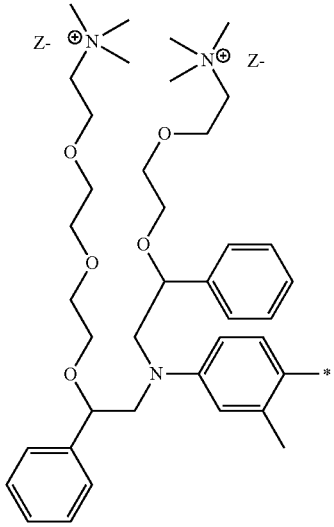
20
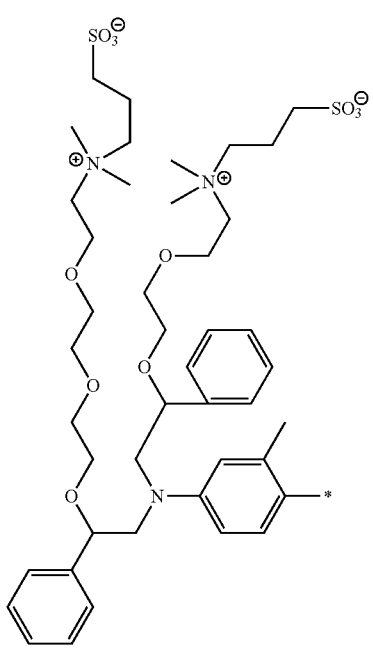
21
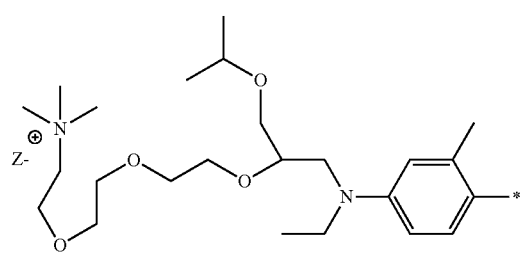

TABLE 4-continued
| | X Moieties |
|---|---|
| No. | Z = O-Tosylate or Halogen |
| 22 | 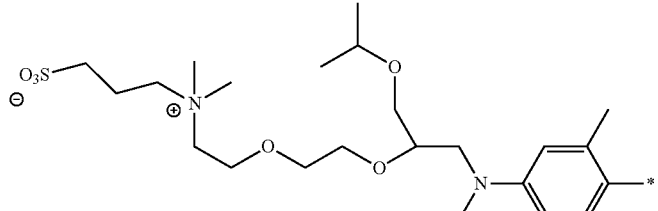 |
| 23 | 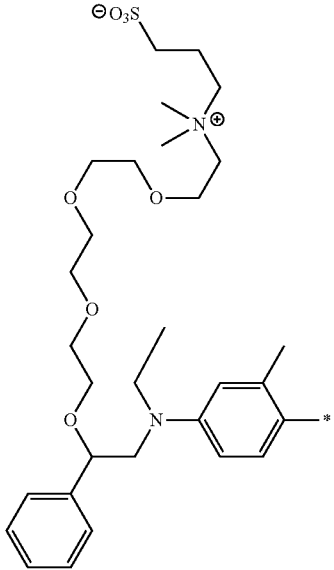 |
| 24 | 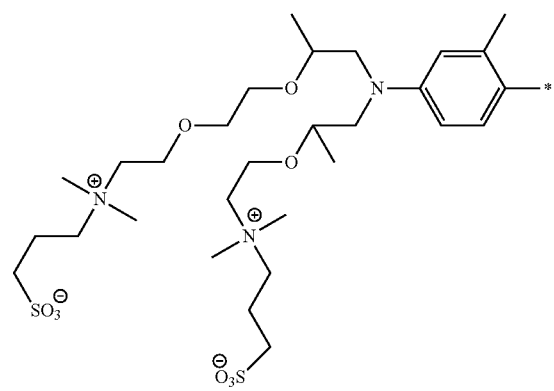 |
| 25 | 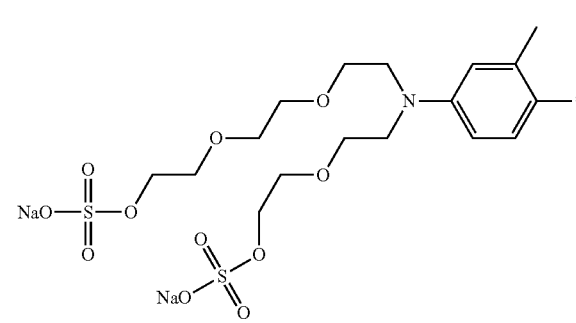 |

TABLE 4-continued

| | X Moieties |
|---|---|
| No. | Z = O-Tosylate or Halogen |

26

27

28

29

30

TABLE 4-continued

X Moieties

| No. | Z = O-Tosylate or Halogen |
|---|---|
| 31 | 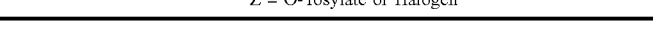 |
| | 15 |

It is contemplated to be within the scope of this invention that the thiophene azo dye having a formally charged moiety may comprise any one of the A moieties selected from Table 1, any one of the $R_6$ substituents selected from Table 2, any one of the $R_4$ and $R_5$ groupings selected from Table 3, and any one of the X moieties selected from Table 4.

In yet another aspect of the invention, suitable thiophene azo dyes include, but are not limited to, the structures shown in Table 5:

TABLE 5

Thiophene Azo Dyes

| No. | Formula |
|---|---|
| Example 1 | 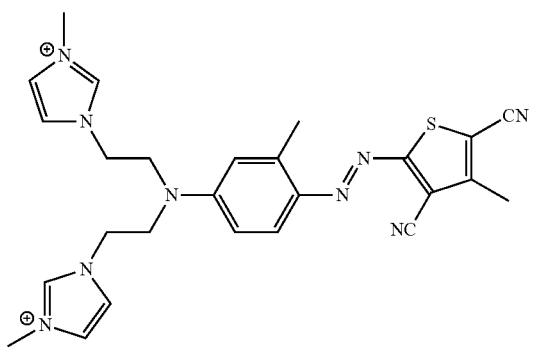 [SMILES: Cc1cc(N(CCn2cc[n+](C)c2)CCn2cc[n+](C)c2)ccc1/N=N/c1sc(C#N)c(C)c1C#N] |
| Example 2 | |

TABLE 5-continued

Thiophene Azo Dyes

| No. | Formula |
|---|---|
| Example 3 | |
| Example 4 | |
| Example 5 | |
| Example 6 | |
| Example 7 | |

TABLE 5-continued
Thiophene Azo Dyes
| No. | Formula |
|---|---|
| Example 8 | 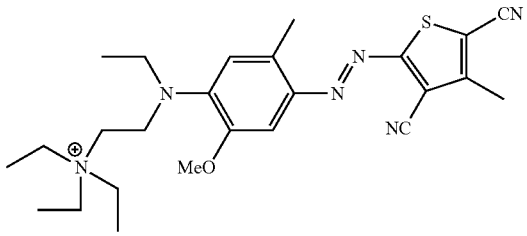 [SMILES: CCN(CC[N+](CC)(CC)CC)c1cc(C)c(/N=N/c2sc(C#N)c(C)c2C#N)cc1OC] |
| Example 9 | 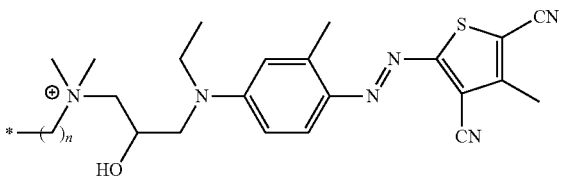<br>n = 12 |
| Example 10 | 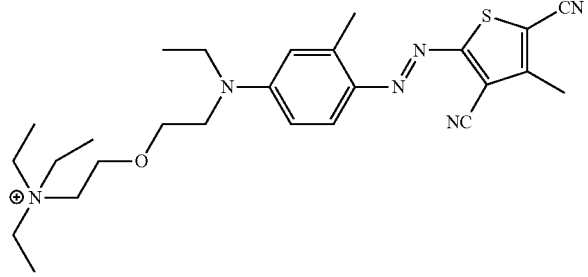 [SMILES: CCN(CCOCC[N+](CC)(CC)CC)c1ccc(/N=N/c2sc(C#N)c(C)c2C#N)c(C)c1] |
| Example 11 | 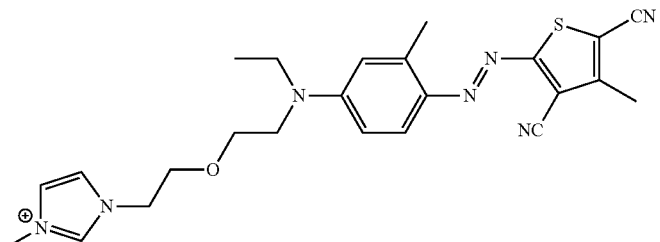 |
| Example 12 | 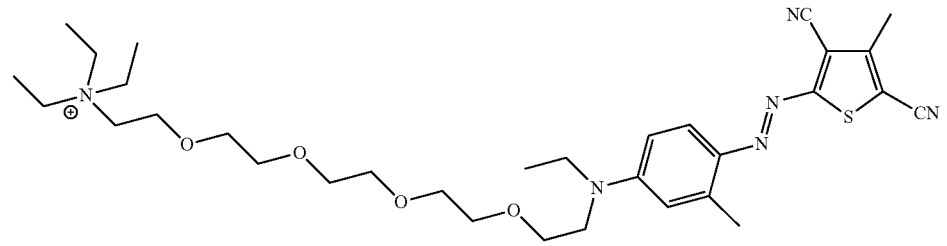 [SMILES: CCN(CCOCCOCCOCCOCC[N+](CC)(CC)CC)c1ccc(/N=N/c2sc(C#N)c(C)c2C#N)c(C)c1] |
| Example 13 | 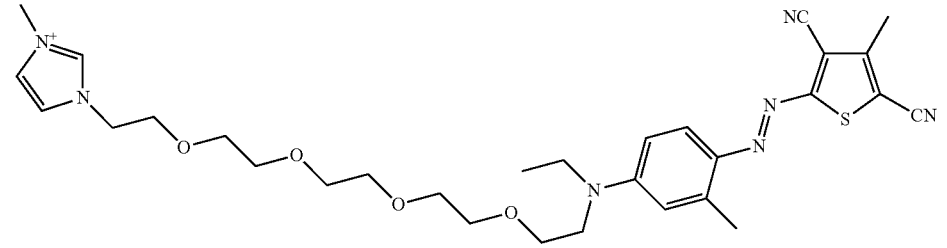 [SMILES: CCN(CCOCCOCCOCCOCCn1cc[n+](C)c1)c1ccc(/N=N/c2sc(C#N)c(C)c2C#N)c(C)c1] |

TABLE 5-continued

Thiophene Azo Dyes

| No. | Formula |
|---|---|
| Example 14 | |
| Example 15 | |
| Example 16 | |
| Example 17 | |
| Example 18 | |

TABLE 5-continued
Thiophene Azo Dyes
| No. | Formula |
|---|---|
| Example 19 | 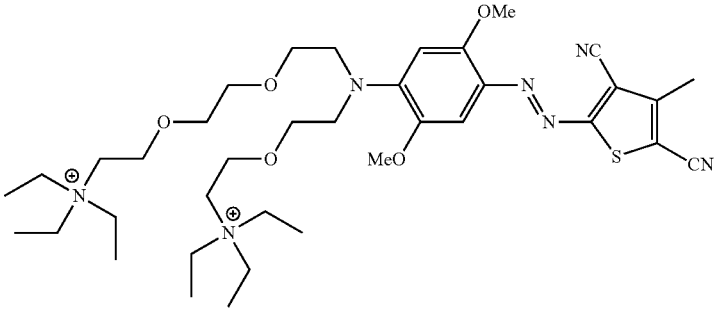 [SMILES: CC[N+](CC)(CC)CCOCCOCCN(CCOCC[N+](CC)(CC)CC)c1cc(OC)c(/N=N/c2sc(C#N)c(C)c2C#N)cc1OC] |
| Example 20 | 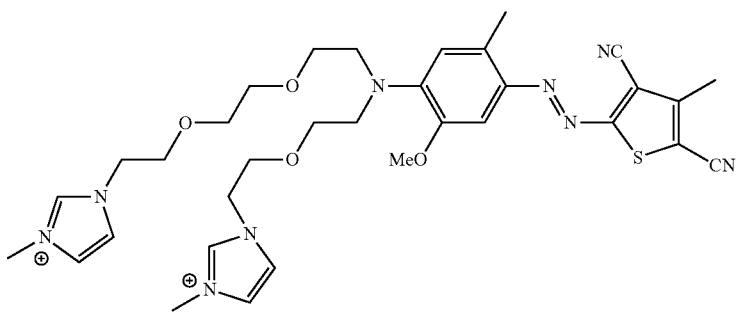 [SMILES: COc1cc(/N=N/c2sc(C#N)c(C)c2C#N)c(C)cc1N(CCOCCOCCn1cc[n+](C)c1)CCOCCn1cc[n+](C)c1] |
| Example 21 | 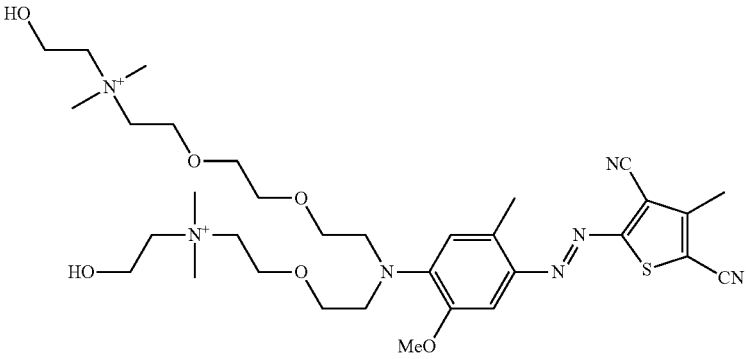 [SMILES: COc1cc(/N=N/c2sc(C#N)c(C)c2C#N)c(C)cc1N(CCOCCOCC[N+](C)(C)CCO)CCOCC[N+](C)(C)CCO] |
| Example 22 | 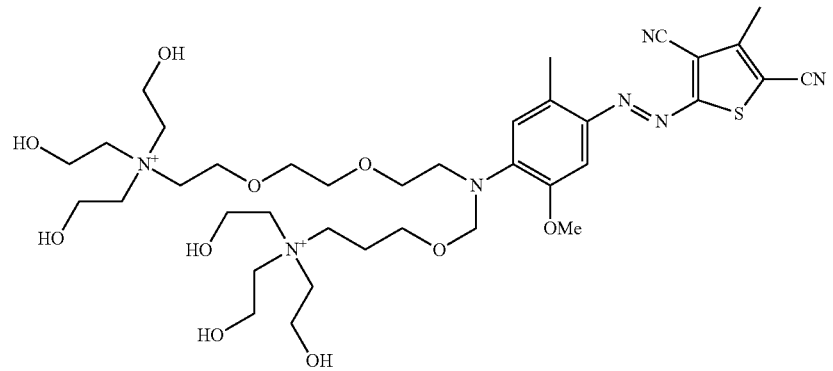 [SMILES: COc1cc(/N=N/c2sc(C#N)c(C)c2C#N)c(C)cc1N(CCOCCOCC[N+](CCO)(CCO)CCO)COCCC[N+](CCO)(CCO)CCO] |

TABLE 5-continued
Thiophene Azo Dyes
| No. | Formula |
|---|---|
| Example 23 | 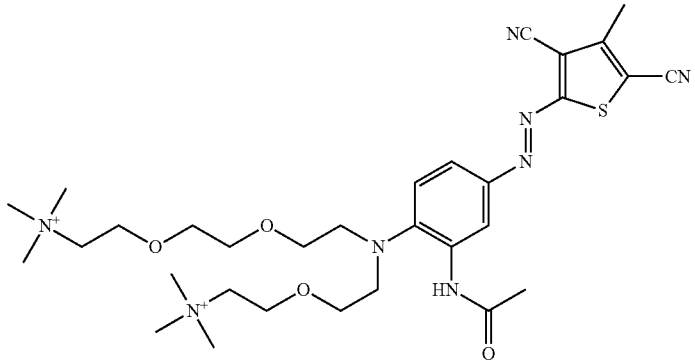 [SMILES: CC(=O)Nc1cc(/N=N/c2sc(C#N)c(C)c2C#N)ccc1N(CCOCCOCC[N+](C)(C)C)CCOCC[N+](C)(C)C] |
| Example 24 | 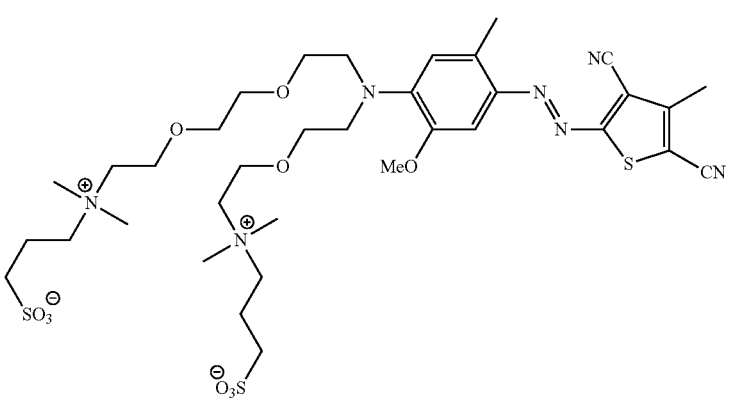 |
| Example 25 | 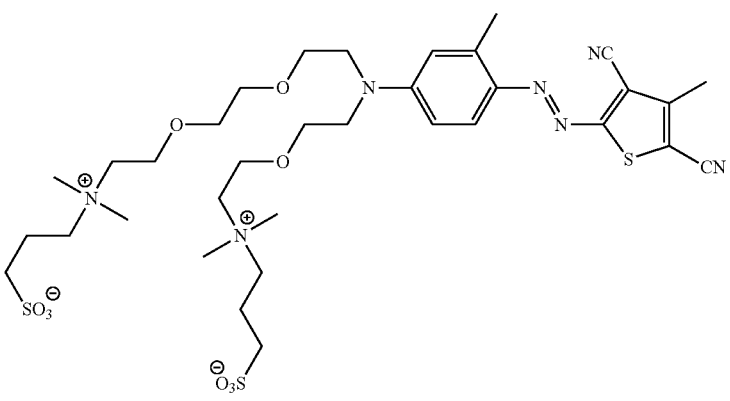 |
| Example 26 | 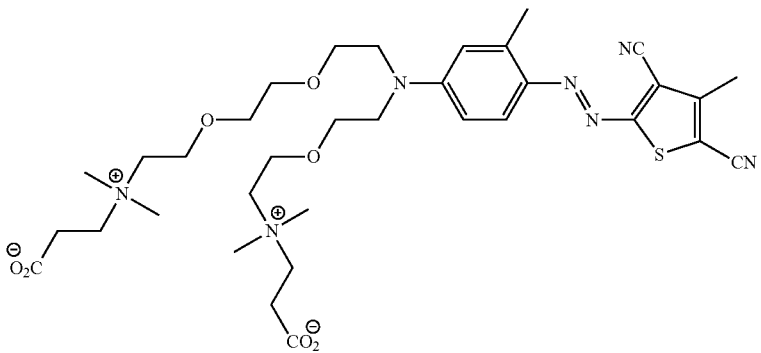 |

TABLE 5-continued

Thiophene Azo Dyes

| No. | Formula |
|---|---|
| Example 27 | |
| Example 28 | |
| Example 29 | |

TABLE 5-continued

Thiophene Azo Dyes

| No. | Formula |
|---|---|
| Example 30 | |
| Example 31 | |
| Example 32 | |
| Example 33 | |

TABLE 5-continued
Thiophene Azo Dyes
| No. | Formula |
|---|---|
| Example 34 | 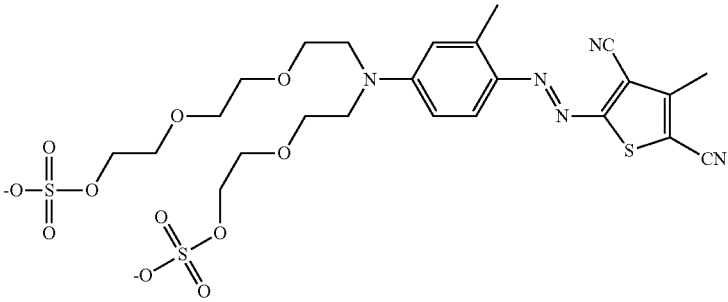 |
| Example 35 | 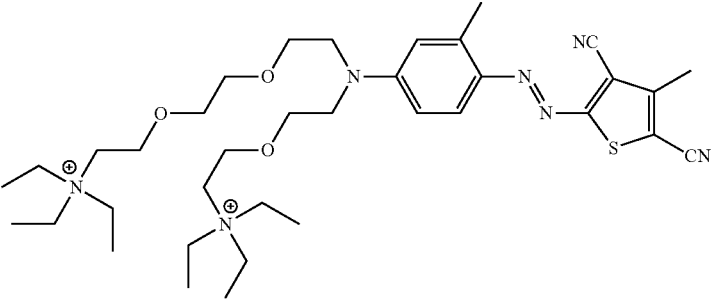 [SMILES: CC[N+](CC)(CC)CCOCCOCCN(CCOCC[N+](CC)(CC)CC)c1ccc(/N=N/c2sc(C#N)c(C)c2C#N)c(C)c1] |
| Example 36 | 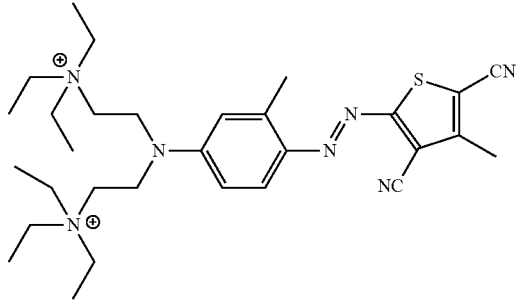 [SMILES: CC[N+](CC)(CC)CCN(CC[N+](CC)(CC)CC)c1ccc(/N=N/c2sc(C#N)c(C)c2C#N)c(C)c1] |
| Example 37 | 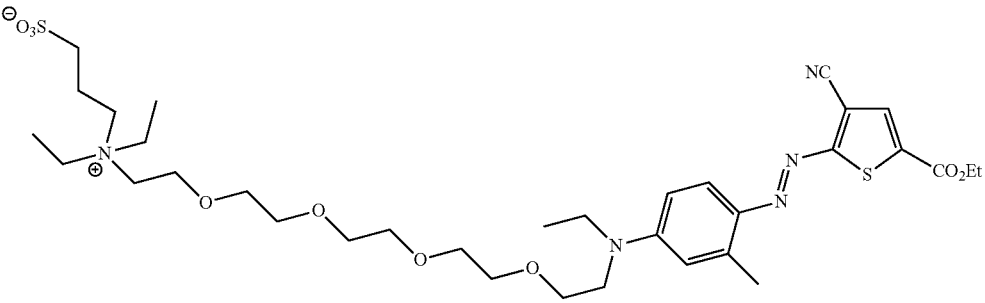 |
| Example 38 | 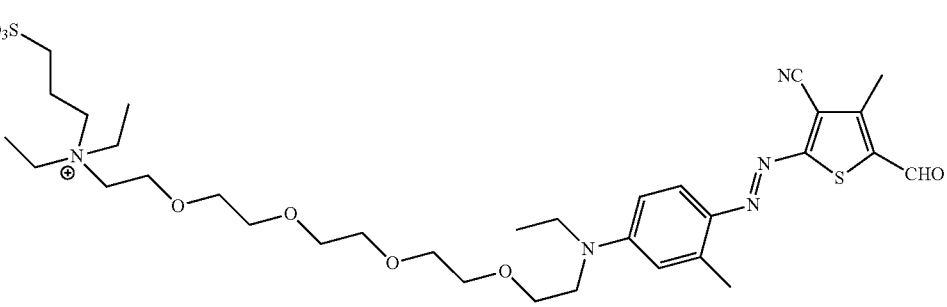 |

TABLE 5-continued

Thiophene Azo Dyes

| No. | Formula |
|---|---|
| Example 39 | 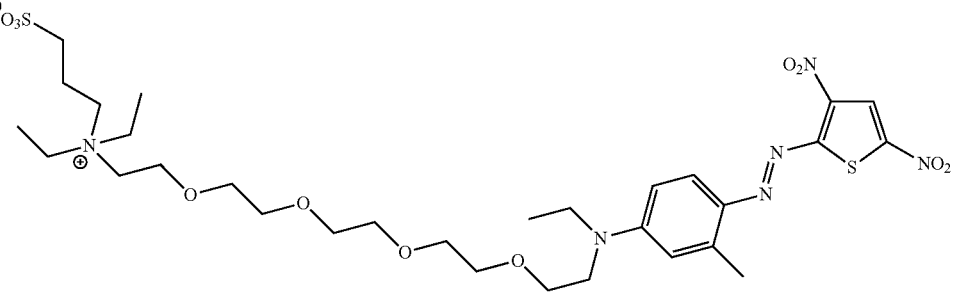 |
| Example 40 | 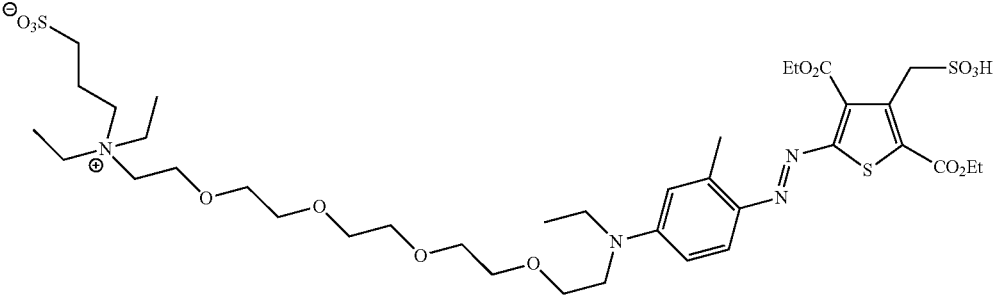 |
| Example 41 | 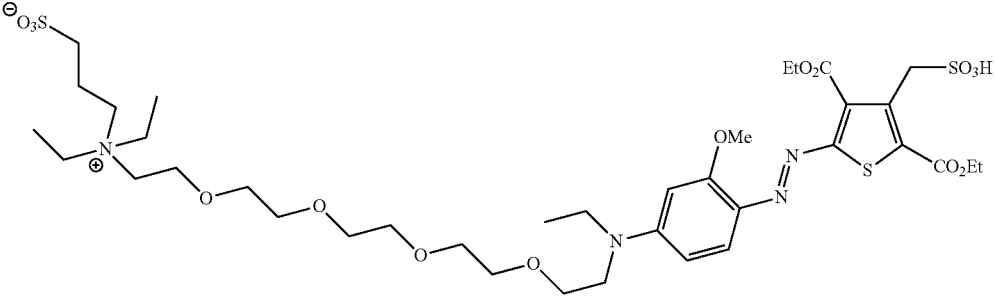 |
| Example 42 | 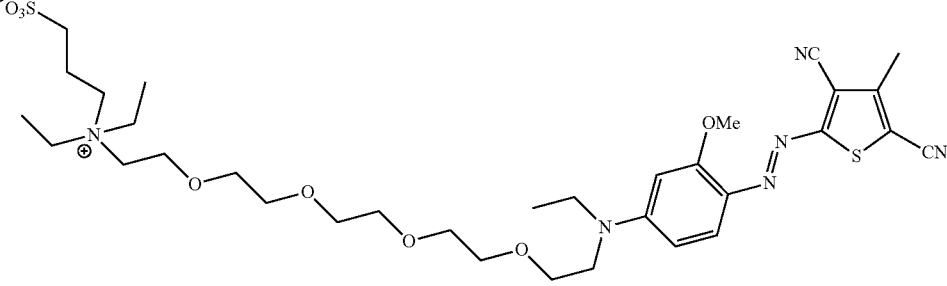 |

As indicated previously, the hueing agents described in the present specification may be incorporated into laundry care compositions including but not limited to laundry detergents and fabric care compositions. The laundry care compositions including laundry detergents may be in solid or liquid form, including a gel form, and/or unit does forms, including multi-compartment unit dose forms. Such compositions may comprise one or more of said hueing agents and a laundry care ingredient.

In one aspect, said laundry care composition may comprise, based on total laundry care composition weight, less than 15% builder, less than 10% builder, or even less than 5% builder.

In one aspect, said laundry care composition may comprise, based on total laundry care composition weight, a total of no more than 20% water; a total of no more than 15% water; a total of no more than 10% water; or even a total of no more than 5% water.

In one aspect, said laundry care composition may comprise, rising, based on total laundry care composition weight, from about 10% to about 70% of a water-miscible organic solvent having a molecular weight of greater than 70 Daltons.

In one aspect, said laundry care composition may comprise, based on total laundry care composition weight, a perfume microcapsule comprising a core and a shell that encapsulates said core, said perfume microcapsule having a D[4,3] average particle of from about 0.01 microns to about 200 microns and optionally a formaldehyde scavenger that is supplied via the addition of the microcapsules (contained in a perfume microcapsule slurry that is added to the laundry care ingredient) and/or added directly to the laundry care composition. In one aspect, the shell of said perfume microcapsules may be made of any material, including materials selected from the group consisting of polyethylenes, polyamides, polystyrenes, polyisoprenes, polycarbonates, polyesters, polyacrylates, polyureas, polyurethanes, polyolefins, polysaccharides, epoxy resins, vinyl polymers, and mixtures thereof. In one aspect, useful shell materials include materials that are sufficiently impervious to the core material and the materials in the environment in which the perfume microcapsule will be employed, to permit the delivery perfume to be obtained. Suitable impervious shell materials include materials selected from the group consisting of reaction products of one or more amines with one or more aldehydes, such as urea cross-linked with formaldehyde or gluteraldehyde, melamine cross-linked with formaldehyde; gelatin-polyphosphate coacervates optionally cross-linked with gluteraldehyde; gelatin-gum Arabic coacervates; cross-linked silicone fluids; polyamine reacted with polyisocyanates and mixtures thereof. In one aspect, the shell material comprises melamine cross-linked with formaldehyde and/or a polyacrylate. Suitable perfume microcapsules may be obtained from Appleton Papers of Appleton Wis., USA.

In one aspect, suitable formaldehyde scavengers include materials selected from the group consisting of sodium bisulfite, urea, ethylene urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), partially hydrolyzed poly(vinylformamide), poly(vinyl amine), poly(ethylene imine), poly(oxyalkyleneamine), poly(vinyl alcohol)-co-poly(vinyl amine), poly(4-aminostyrene), poly(l-lysine), chitosan, hexane diol, ethylenediamine-N,N'-bisacetoacetamide, N-(2-ethylhexyl)acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid, or a mixture thereof. These formaldehyde scavengers may be obtained from Sigma/Aldrich/Fluka of St. Louis, Mo. U.S.A. or Poly-Sciences, Inc. of Warrington, Pa. U.S.A.

Such formaldehyde scavengers are typically combined with a slurry containing said perfume microcapsules, at a level, based on total slurry weight, of from about 2 wt. % to about 18 wt. %, from about 3.5 wt. % to about 14 wt. % or even from about 5 wt. % to about 13 wt. %.

In one aspect, such formaldehyde scavengers may be combined with a product containing a perfume microcapsule, said scavengers being combined with said product at a level, based on total product weight, of from about 0.005% to about 0.8%, alternatively from about 0.03% to about 0.5%, alternatively from about 0.065% to about 0.25% of the product formulation.

In another aspect, such formaldehyde scavengers may be combined with a slurry containing said perfume microcapsules, at a level, based on total slurry weight, of from about 2 wt. % to about 14 wt. %, from about 3.5 wt. % to about 14 wt. % or even from about 5 wt. % to about 14 wt. % and said slurry may be added to a product matrix to which addition an identical or different scavenger may be added at a level, based on total product weight, of from about 0.005% to about 0.5%, alternatively from about 0.01% to about 0.25%, alternatively from about 0.05% to about 0.15% of the product formulation, In one aspect, one or more of the aforementioned formaldehyde scavengers may be combined with a liquid fabric enhancing product containing perfume microcapsules at a level, based on total liquid fabric enhancing product weight, of from 0.005% to about 0.8%, alternatively from about 0.03% to about 0.4%, alternatively from about 0.06% to about 0.25% of the product formulation In one aspect, such formaldehyde scavengers may be combined with a liquid laundry detergent product containing perfume microcapsules, said scavengers being selected from the group consisting of sodium bisulfite, urea, ethylene urea, cysteine, cysteamine, lysine, glycine, serine, carnosine, histidine, glutathione, 3,4-diaminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), partially hydrolyzed poly(vinylformamide), poly(vinyl amine), poly(ethylene imine), poly(oxyalkyleneamine), poly(vinyl alcohol)-co-poly(vinyl amine), poly(4-aminostyrene), poly(1-lysine), chitosan, hexane diol, ethylenediamine-N,N'-bisacetoacetamide, N-(2-ethylhexyl)acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid and mixtures thereof, and combined with said liquid laundry detergent product at a level, based on total liquid laundry detergent product weight, of from about 0.003 wt. % to about 0.20 wt. %, from about 0.03 wt. % to about 0.20 wt. % or even from about 0.06 wt. % to about 0.14 wt. %.

The hueing agents may be added to substrates using a variety of application techniques. For instance, for application to cellulose-containing textile substrates, the hueing agent may be included as a component of a laundry detergent. Thus, application to a cellulose-containing textile substrate actually occurs when a consumer adds laundry detergent to a washing machine. The hueing agent may be present in the laundry detergent composition in an amount from about 0.000001% to about 10% by weight of the composition, from about 0.00001% to about 10% by weight of the composition, from about 0.0001% to about 5% by weight of the composition, and even from about 0.0001% to about 1% by weight of the composition.

The laundry detergent composition typically comprises a surfactant in an amount sufficient to provide desired cleaning properties. In one aspect, the laundry detergent composition may comprise, based on total laundry detergent composition weight, from about 0.5% to about 99% of the surfactant; from about 1% to about 95% of the surfactant; from about 5% to about 90% of the surfactant, from about 5% to about 70% of the surfactant, or even from about 5% to about 40% of the surfactant. The surfactant may comprise anionic, nonionic, cationic, zwitterionic and/or amphoteric surfactants. In one aspect, the detergent composition comprises anionic surfactant, nonionic surfactant, or mixtures thereof.

Fabric care compositions are typically added in the rinse cycle, which is after the detergent solution has been used and replaced with the rinsing solution in typical laundering processes. The fabric care compositions disclosed herein may be comprise a rinse added fabric softening active and a suitable hueing agent as disclosed in the present specification. The fabric care composition may comprise, based on total fabric care composition weight, from about 1% to about 90%, or from about 5% to about 50% fabric softening active. The hueing agent may be present in the fabric care composition in an amount from about 0.5 ppb to about 50 ppm, or from about 0.5 ppm to about 30 ppm.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, perfume(s) including quadrant perfumes and additional perfume delivery systems including perfume loaded zeolites, starch encapsuled accords, and Schiff base pro-perfumes, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain aspects of Applicants' compositions do not contain one or more of the following adjuncts materials: fabric softening actives, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, or $C_{11}$-$C_{14}$ alkyl benzene sulfonic acids. In one aspect, the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially useful are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In one aspect, R' is $C_{10}$-$C_{18}$ alkyl, n is from about 1 to 15, and M is sodium, potassium, ammonium, alkylammonium, or alkanolammonium. In one aspect, R' is a $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In one aspect, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of suitable cations including sodium, potassium, ammonium, and mixtures thereof, and x is an integer of at least about 7, or at least about 9, and y is an integer of at least 8, or at least about 9; d) $C_{10}$-$C_{18}$ alkyl alkoxy sulfates (AE$_x$S) wherein x is from 1-30; e) $C_{10}$-$C_{18}$ alkyl alkoxy carboxylates in one aspect, comprising 1-5 ethoxy units; f) mid-chain branched alkyl sulfates as discussed in U.S. Pat. No. 6,020,303 and U.S. Pat. No. 6,060,443; g) mid-chain branched alkyl alkoxy sulfates as discussed in U.S. Pat. No. 6,008,181 and U.S. Pat. No. 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. In one aspect, for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17 from about 6 to 15, or from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, 10 to 16 carbon atoms, or is a $C_{12}$-$C_{16}$ primary alkyl. R' is a short-chain moiety, in one aspect R' may be selected from hydrogen, methyl and —CH$_2$OH. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, BAE$_R$, wherein x if from 1-30, as discussed in U.S. Pat. No. 6,153,577, U.S. Pat. No. 6,020,303 and U.S. Pat. No. 6,093,856; f) Alkylpolysaccharides as discussed in U.S. Pat. No. 4,565,647 to Llenado, issued Jan. 26, 1986; specifically alkylpolyglycosides as discussed in U.S. Pat. No. 4,483,780 and U.S. Pat. No. 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (in one aspect $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, or $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Aqueous, Non-Surface Active Liquid Carrier

As noted, the laundry care compositions may be in the form of a solid, either in tablet or particulate form, including, but not limited to particles, flakes, sheets, or the like, or the compositions may be in the form of a liquid. The liquid detergent compositions may comprise an aqueous, non-surface active liquid carrier. Generally, the amount of the aqueous, non-surface active liquid carrier employed in the compositions herein will be effective to solubilize, suspend or disperse the composition components. For example, the liquid detergent compositions may comprise, based on total liquid detergent composition weight, from about 5% to about 90%, from about 10% to about 70%, or from about 20% to about 70% of the aqueous, non-surface active liquid carrier.

The most cost effective type of aqueous, non-surface active liquid carrier is typically water. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids typically is minimized to hold down composition cost. Accordingly, the aqueous liquid carrier component of the liquid detergent products herein will generally comprise water present in concentrations ranging from about 5% to about 90%, or from about 5% to about 70%, by weight of the liquid detergent composition.

Bleaching Agents

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phthalocyanine;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

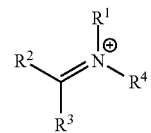

[I]

where $R^1$-$R^4$ may be a hydrogen or an unsubstituted or substituted radical selected from the group consisting of phenyl, aryl, heterocyclic ring, alkyl and cycloalkyl radicals.

Suitable bleach boosting compounds include zwitterionic bleach boosters zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are typically employed in conjunction with a peroxygen source in the bleaching systems of the present invention.

Enzyme Bleaching—Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m$^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

In one aspect, the fabric softening active ("FSA") is a quaternary ammonium compound suitable for softening fabric in a rinse step. In one aspect, the FSA is formed from a reaction product of a fatty acid and an aminoalcohol obtaining mixtures of mono-, di-, and, in one aspect, triester compounds. In another aspect, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain aspects of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

wherein each R substituent is either hydrogen, a short chain $C_1$-$C_6$, for example $C_1$-$C_3$ alkyl or hydroxyalkyl group, e.g., methyl, ethyl, propyl, hydroxyethyl, and the like, poly ($C_{2-3}$ alkoxy), for example, polyethoxy, group, benzyl, or mixtures thereof; each m is 2 or 3; each n is from 1 to about 4, or 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, or $C_{14}$-$C_{20}$, with each $R^1$ being a hydrocarbyl, or substituted hydrocarbyl group; it is acceptable for $R^1$ to be unsaturated or saturated and branched or linear and in one aspect it is linear; it is acceptable for each $R^1$ to be the same or different and typically these are the same; and $X^-$ can be any softener-compatible anion, suitable anions include, chloride, bromide, methylsulfate, ethylsulfate, sulfate, phosphate, and nitrate, in one aspect the anions are chloride or methyl sulfate. Suitable DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one aspect, the FSA comprises other actives in addition to DQA (1) or DQA. In yet another aspect, the FSA comprises only DQA (1) or DQA and is free or essentially free of any other quaternary ammonium compounds or other actives. In yet another aspect, the FSA comprises the precursor amine that is used to produce the DQA.

In another aspect of the invention, the FSA comprises a compound, identified as DTTMAC comprising the formula:

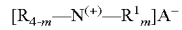

wherein each m is 2 or 3, each $R^1$ is a $C_6$-$C_{22}$, or $C_{14}$-$C_{20}$, but no more than one being less than about $C_{12}$ and then the other is at least about 16, hydrocarbyl, or substituted hydrocarbyl substituent, for example, $C_{10}$-$C_{20}$ alkyl or alkenyl (unsaturated alkyl, including polyunsaturated alkyl, also referred to sometimes as "alkylene"), in one aspect $C_{12}$-$C_{18}$ alkyl or alkenyl, and branch or unbranched. In one aspect, the Iodine Value (IV) of the FSA is from about 1 to 70; each R is H or a short chain $C_1$-$C_6$, or $C_1$-$C_3$ alkyl or hydroxyalkyl group, e.g., methyl, ethyl, propyl, hydroxyethyl, and the like, benzyl, or $(R^2 0)_{2-4}H$ where each $R^2$ is a $C_{1-6}$ alkylene group; and $A^-$ is a softener compatible anion, suitable anions include chloride, bromide, methylsulfate, ethylsulfate, sulfate, phosphate, or nitrate; in one aspect the anions are chloride or methyl sulfate.

Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one aspect, the FSA comprises other actives in addition to DTTMAC. In yet another aspect, the FSA comprises only compounds of the DTTMAC and is free or essentially free of any other quaternary ammonium compounds or other actives.

In one aspect, the FSA comprises an FSA described in U.S. Pat. Pub. No. 2004/0204337 A1, published Oct. 14, 2004 to Corona et al., from paragraphs 30-79. In another aspect, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one aspect, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one aspect, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another aspect of the invention provides for a rinse added fabric softening composition further comprising a cationic starch. Cationic starches are disclosed in US 2004/0204337 A1. In one aspect, the rinse added fabric softening composition comprises from about 0.1% to about 7% of cationic starch by weight of the fabric softening composition. In one aspect, the cationic starch is HCP401 from National Starch.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Processes of Making Laundry Care Compositions

The laundry care compositions of the present invention can be formulated into any suitable form and prepared by any process chosen by the formulator, non-limiting examples of which are described in Applicants' examples and in U.S. Pat. No. 5,879,584; U.S. Pat. No. 5,691,297; U.S. Pat. No. 5,574,005; U.S. Pat. No. 5,569,645; U.S. Pat. No. 5,565,422; U.S. Pat. No. 5,516,448; U.S. Pat. No. 5,489,392; U.S. Pat. No. 5,486,303 all of which are incorporated herein by reference.

The liquid detergent compositions may be in the form of an aqueous solution or uniform dispersion or suspension of surfactant, hueing agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, or from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid detergent compositions, the hueing agent is first combined with one or more liquid components to form a hueing agent premix, and this hueing agent premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the hueing agent premix and the enzyme component are added at a final stage of component additions. In another aspect, the hueing agent is encapsulated prior to addition to the detergent composition, the encapsulated hueing agent is suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the hueing agent is provided in particulate form, optionally including additional but not all components of the laundry detergent composition. The hueing agent particulate is combined with one or more additional particulates containing a balance of components of the laundry detergent composition. Further, the hueing agent, optionally including additional but not all components of the laundry detergent composition, may be provided in an encapsulated form, and the hueing agent encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, for example in a conventional fabric laundering automatic washing machine, to form such aqueous laundering solutions. The aqueous washing solution so formed is then contacted, typically under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

In one aspect, method of treating and/or cleaning a surface or fabric comprising the steps of optionally washing and/or rinsing said surface or fabric, contacting said surface or fabric with any laundry care composition disclosed in this specification, then optionally washing and/or rinsing said surface and/or fabric then optionally letting said surface or fabric to dry and/or actively drying said surface or fabric, is disclosed.

EXAMPLES

The following examples are provided to further illustrate the hueing agents of the present invention; however, they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Sample Preparation and Test Methods

A. Sample Preparation

The following general procedures were used to prepare the thiophene azo dyes of the present invention.

Preparation of Glycidol Materials

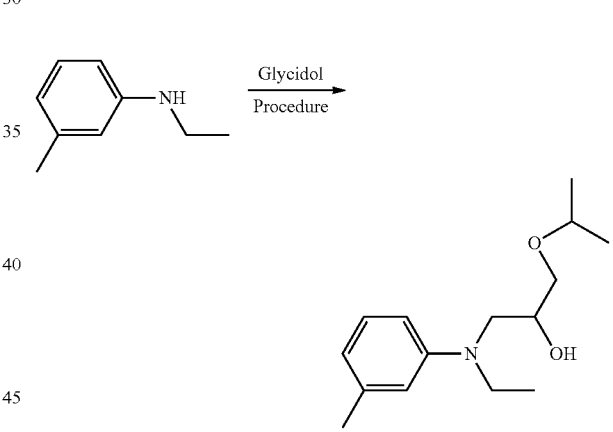

18 parts N-ethyl-m-toluidine, 52 parts isopropyl-glycidyl ether, and 50 parts toluene were charged into a 200 mL round bottom flask at room temperature. The mixture was refluxed overnight. The solvent was removed and the resulting material was used crude for the next step. These materials were then alkoxylated as described herein.

Preparation of Alkoxylated Intermediates

General Procedure for Alkoxylation—Method A:
Intermediate Type 1, Initial Single Site Polymer

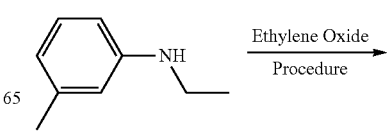

-continued

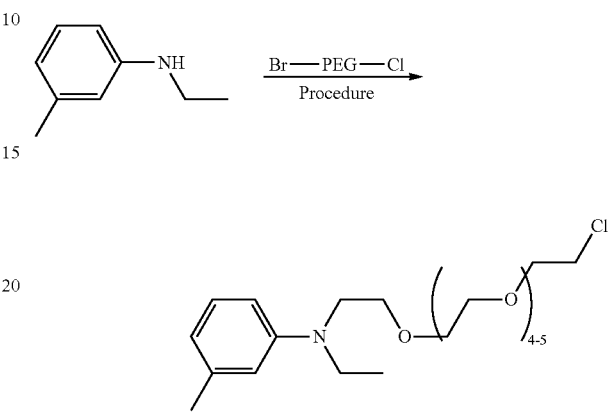

18 parts N-ethyl-m-toluidine, 14 parts acetic acid, and 20 parts water were charged into a 200 mL stainless steel autoclave at room temperature. 11 parts ethylene oxide was added over several hours. After the reaction was kept for 24 hours at room temperature, the vessel was charged with 0.2 parts NaOH and heated up to 125° C. Then, ethylene oxide was added over about 1 hour. After continuing the reaction for another 3 hours at 125° C., residual EO was removed by vacuum. Then it was cooled to room temperature and the intermediate obtained was an amber-colored viscous liquid. The constant average number of EO could be achieved every time by controlling the amount of ethylene oxide in the synthesis.

Intermediate Type 2, Initial Dual Chain Polymer

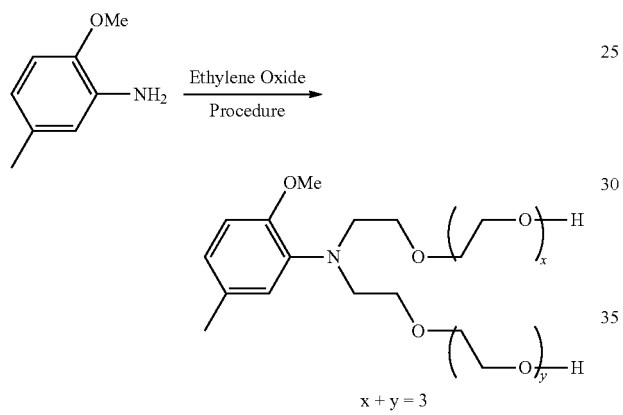

x + y = 3

18 parts 2-Methoxy-5-methylaniline, 14 parts acetic acid, and 20 parts water were charged into a 200 mL stainless steel autoclave at room temperature. 22 parts ethylene oxide was added over several hours. After the reaction was kept for 24 hours at room temperature, the vessel was charged with 0.2 parts NaOH and heated up to 125° C. Then, 40 parts ethylene oxide was added over about 1 hour. After continuing the reaction for another 3 hours at 125° C., residual EO was removed by vacuum. Then it was cooled to room temperature and the intermediate obtained was an amber-colored viscous liquid. The constant average number of EO could be achieved every time by controlling the amount of ethylene oxide in the synthesis.

General Procedure for Alkoxylation—Method B:

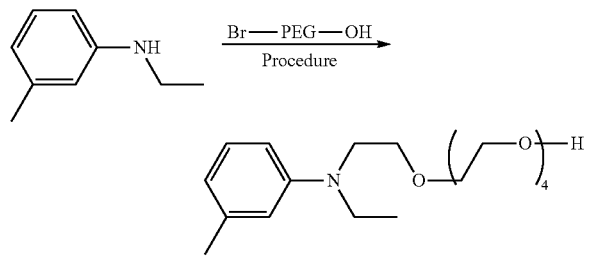

18 parts aniline, 60 parts mono-bromo-polyethylene glycol-200, 20 parts NaHCO$_3$ and 50 parts toluene were charged into a 200 mL round bottom flask at room temperature. The reaction mixture was heated to 80° C. for 5 hours. The salt was filtered and the solvent removed from the filtrate via low pressure distillation. The crude product was used with no further purification for the next step.

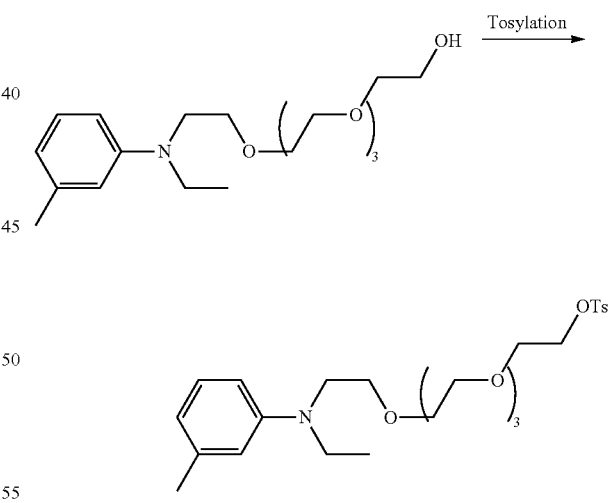

It is also possible to use a mono-bromo-mono-chloro glycol in order to directly make the halogenated product using this same procedure above.

General Procedure for Tosylation of Intermediates

Intermediate Type 1

To a mixture of 44 parts N-ethyl-N-alkylene oxide-m-toluidine and 41 parts tosyl chloride in 20 parts water was slowly added 20 parts 25% NaOH. The reaction mixture was then allowed to stir for 4 hours at room temperature. The mixture was diluted with 400 parts water and then neutralized by addition of 33% hydrochloric acid. 400 parts ethyl acetate was added and the mixture was phase separated. The organic phase was dried over anhydrous sodium sulfate, filtered and the solvent evaporated. The crude product was immediately used for the next step.

Intermediate Type 2

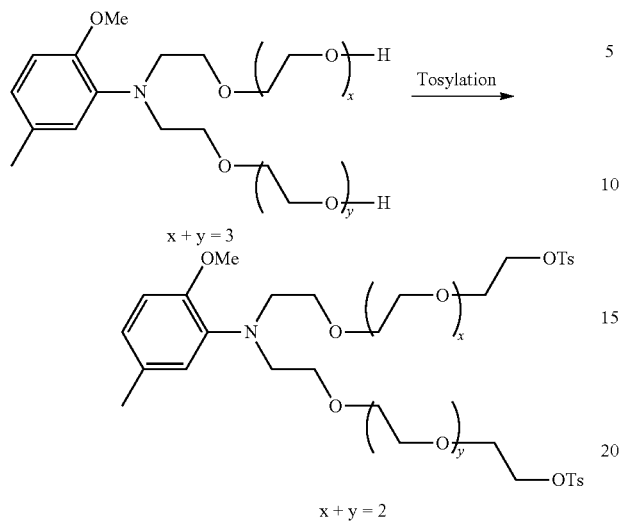

To a mixture of 44 parts 2-methoxy-5-methyl-N-bis-alkyleneoxide-aniline and 82 parts tosyl chloride in 30 parts water was slowly added 30 parts 25% NaOH. The reaction mixture was then allowed to stir for 4 hours at room temperature. The mixture was diluted with 400 parts water and then neutralized by addition of 33% hydrochloric acid. 400 parts ethyl acetate was added and the mixture was phase separated. The organic phase was dried over anhydrous sodium sulfate, filtered and the solvent evaporated. The crude product was immediately used for the next step.

General Procedure for Quaternization

Intermediate Type 1

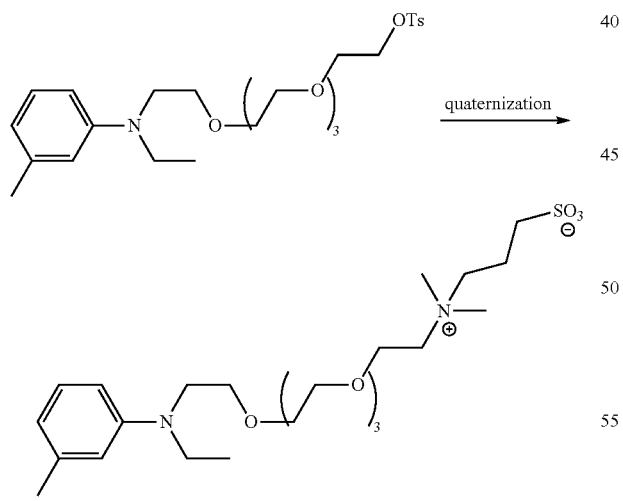

40 parts of the tosylated intermediate, 20 parts dimethyl-aminopropyl sulfonate and 100 parts chloroform were mixed and refluxed for 6 hours. The material was then cooled down and 200 parts water was added. The material was phase separated and the aqueous phase was found to contain the desired product. The aqueous phase was dried down via low pressure distillation. The chloride material can be used in the same way to make the chloro salt version.

Intermediate Type 2

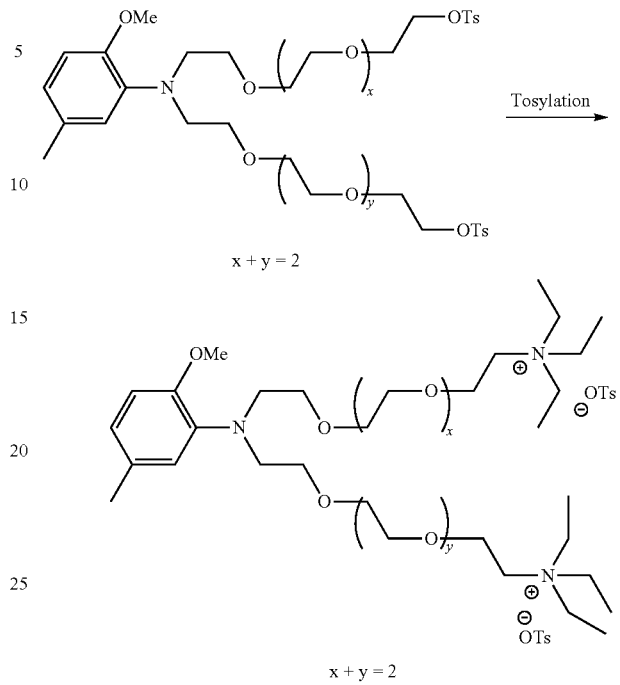

40 parts of the tosylated intermediate, 30 parts triethyl-amine and 100 parts chloroform were mixed and refluxed for 6 hours. The material was then cooled down and 200 parts water was added. The material was phase separated and the aqueous phase was found to contain the desired product. The aqueous phase was dried down via low pressure distillation.

General Procedures for Color Synthesis

All colors were prepared following the same general procedure.

Example 12

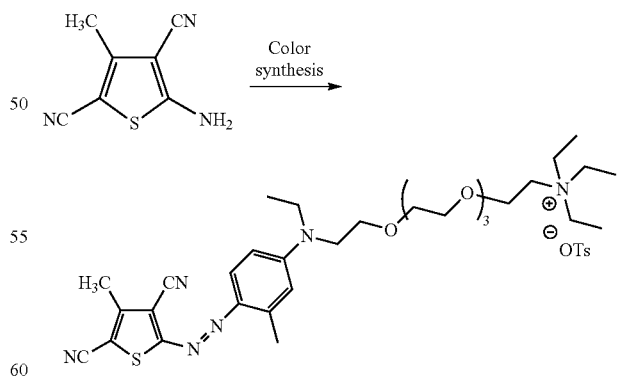

2 parts amino-thiophene, and 30 parts phosphoric acid, were charged into 200 mL glass flask and cooled to 0-5° C. 1 part $NaNO_2$ was slowly added as a solid, maintaining the temperature below 10° C. When addition was completed for diazotization, the mixture was stirred for 30 minutes and excess sodium nitrite was consumed by adding 0.3 parts sulfamic acid. Enough sulfamic acid was added until starch iodide paper provided a negative result. To a separate flask was added the 6 parts of the quaternized material prepared following Intermediate Type 1 route, wherein quaternization was done using 1 molar equivalent of triethylamine and 12 parts water. The prepared diazonium salt solution was slowly added into the above solution for coupling reaction. Care was taken to not allow the temperature to rise above 10° C. After complete addition of diazonium salt solution, the reaction was allowed to slowly reach room temperature over an hour. The mixture was then neutralized with sodium hydroxide and phase separated. The product layer was then dissolved with methanol and filtered to remove any excess salts. The filtrate was evaporated and the product of this reaction can be used at this point or further diluted with water to a lower viscosity.

Example 1

Example 1 was prepared via the Intermediate Type 2 procedures, wherein only 2 moles of ethylene oxide were added to the initial material and the tosylated material was quaternized by using 2 molar equivalents N-methyl imidazole. Colorant synthesis was as described in Example 12.

Example 2

Example 2 was prepared as Example 1, except the initial alkoxylation was done using m-toluidine.

Example 7

Example 7 was prepared via the Intermediate Type 1 procedures, wherein only 1 mole of ethylene oxide was added to the N-ethyl-aniline and the tosylated material was quaternized by using 1 molar equivalent triethylamine. Colorant synthesis was as described in Example 12.

Example 13

Example 13 was prepared as Example 12, except quaternization was done with N-methyl imidazole.

Example 14

Example 14 was prepared as Example 12, except quaternization was done with N,N-Dimethyl-glycine.

Example 15

Example 15 was prepared as Example 12, except quaternization was done with N,N-Dimethylpropyl sulfonate.

Example 18

Example 18 was prepared via the Intermediate Type 2 procedures and colorant synthesis was as described in Example 12.

Example 19

Example 19 was prepared via the Intermediate Type 2 procedures, wherein the initial alkoxylation was done using 2,5-dimethoxyaniline and colorant synthesis was as described in Example 12.

Example 21

Example 21 was prepared via the Intermediate Type 2 procedures, wherein quaternization was done using dimethylethanolamine and colorant synthesis was as described in Example 12.

Example 22

Example 22 was prepared via the Intermediate Type 2 procedures, wherein quaternization was done using triethanolamine and colorant synthesis was as described in Example 12.

Example 35

Example 35 was prepared via the Intermediate Type 2 procedures, wherein alkoxylation was done using m-toluidine and quaterinzation was done using triethylamine. Colorant synthesis was as described in Example 12.

Example 36

Example 36 was prepared as Example 1, except that the initial alkoxylation was done using m-toluidine and quaternization was done using triethylamine. Color synthesis was as described in Example 12.

B. Test Methods

I. Method for Determining the Aqueous Partition Value of a Dye

Dissolve in deionized water to a final volume of 10.0 mL an amount of dye sufficient to provide a solution absorbance value between 0.25 and 1.0, said absorbance being determined at the dye $\lambda_{max}$ between 400 nm and 750 nm, using a cuvette with 1.0 cm path length. Measure the absorbance of the sample at the dye $\lambda_{max}$ in a UV/Vis spectrophotometer, then transfer the entire 10.0 mL solution to a 50.0 mL plastic centrifuge tube. Add 10.0 mL of 1-octanol, cap the tube, and mix vigorously for 30 seconds using a Vortex™ mixer. Leave the tube standing undisturbed until the layers cleanly phase separate. If the layers do not cleanly separate within several hours, centrifuge to obtain phase separation.

Using a transfer pipette, withdraw an aliquot of the aqueous (bottom) layer and transfer it to a cuvette with 1.0 cm path length for spectrophotometric analysis. Analyze the solution as before, and quantify the absorbance loss at $\lambda_{max}$ as "% of Dye Remaining in Aqueous Layer" as detailed below:

% of Dye Remaining in Aqueous Layer=Aqueous Partition Value(APV)=$(A_f/A_i)$×100% wherein $A_i$ is the initial solution absorbance at $\lambda_{max}$ and $A_f$ is the final solution absorbance at $\lambda_{max}$.

II. Method for Determining Hueing Efficiency for Detergents a.) Two 25 cm×25 cm fabric swatches of 16 oz white cotton interlock knit fabric (270 g/square meter, brightened with Uvitex BNB fluorescent whitening agent, from Test Fabrics. P.O. Box 26, Weston, Pa., 18643) are obtained.
b.) Prepare two one liter aliquots of tap water containing 1.55 g of AATCC standard heavy duty liquid (HDL) test detergent.
c.) Add a sufficient amount the dye to be tested to one of the aliquots from Step b.) above to produce an aqueous solution absorbance of 1 AU.

d.) Wash one swatch from a.) above in one of the aliquots of water containing 1.55 g of AATCC standard heavy duty liquid (HDL) test detergent and wash the other swatch in the other aliquot. Such washing step should be conducted for 30 minutes at room temperature with agitation. After such washing step separately rinse the swatches in tap water and air dry the swatches in the dark.

e.) After rinsing and drying each swatch, the hueing efficiency, $DE^*_{\mathit{eff}}$ of the dye is assessed by determining the L*, a*, and b* value measurements of each swatch using a Hunter LabScan XE reflectance spectrophotometer with D65 illumination, 10° observer and UV filter excluded. The hueing efficiency of the dye is then calculated using the following equation:

$$DE^*_{\mathit{eff}} = ((L^*_c - L^*_s)^2 + (a^*_c - a^*_s)^2 + (b^*_c - b^*_s)^2)^{1/2}$$

wherein the subscripts c and s respectively refer to the L*, a*, and b* values measured for the control, i.e., the fabric sample washed in detergent with no dye, and the fabric sample washed in detergent containing the dye to be screened.

III. Method for Determining Wash Removability a.) Prepare two separate 150 ml aliquots of HDL detergent solution, according to AATCC Test Method 61-2003, Test 2A and containing 1.55 g/liter of the AATCC HDL formula in distilled water.

b.) A 15 cm×5 cm sample of each fabric swatch from the Method for Determining of Hueing Efficiency For Detergents described above is washed in a Launderometer for 45 minutes at 49° C. in 150 ml of a the HDL detergent solution prepared according to Step II. a.) above.

c.) The samples are rinsed with separate aliquots of rinse water and air dried in the dark, and then L*, a*, and b* value measurements of each swatch are taken using a Hunter LabScan XE reflectance spectrophotometer with D65 illumination, 10° observer and UV filter excluded. The amount of residual coloration is assessed by measuring the $DE^*_{\mathit{res}}$, calculated using the following equation:

$$DE^*_{\mathit{res}} = ((L^*_c - L^*_s)^2 + (a^*_c - a^*_s)^2 + (b^*_c - b^*_s)^2)^{1/2}$$

wherein the subscripts c and s respectively refer to the L*, a*, and b* values measured for the control, i.e., the fabric sample initially washed in detergent with no dye, and the fabric sample initially washed in detergent containing the dye to be screened. The wash removal value for the dye is then calculated according to the formula: % removal=100×(1−$DE^*_{\mathit{res}}$/$DE^*_{\mathit{eff}}$).

C. Test Results

The aqueous partitioning values of several examples are provided in Table 6.

TABLE 6

Aqueous Partitioning Values of Thiophene Azo Dyes

| Dye | % Dye in Water Layer | % Dye in Octanol Layer (Presumed) |
|---|---|---|
| Example 1 | 97% | 3% |
| Example 2 | 83% | 17% |
| Example 7 | 15% | 85% |
| Example 12 | 15% | 85% |
| Example 13 | 20% | 80% |
| Example 14 | 4% | 96% |
| Example 15 | 3% | 97% |
| Example 18 | 49% | 51% |
| Example 19 | 78% | 22% |
| Example 21 | 75% | 25% |
| Example 22 | 56% | 44% |
| Example 35 | 66% | 34% |
| Example 36 | 94% | 6% |

Exemplary Detergent Formulations

Formulations 1a-11: Liquid Detergent Formulations

Tables 7A and 7B provide examples of liquid detergent formulations which include at least one thiophene azo dye of the present invention as a hueing agent. The formulations are shown in Table 7A as Formulations 1a through 1f and in Table 7B as Formulations 1g through 11.

TABLE 7A

Liquid Detergent Formulations Comprising the Inventive Hueing Agent

| Ingredient | 1a wt % | 1b wt % | 1c wt % | 1d wt % | 1e wt % | 1f[5] wt % |
|---|---|---|---|---|---|---|
| sodium alkyl ether sulfate | 14.4% | 14.4% |  | 9.2% | 5.4% |  |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% |  |  |  |
| citric acid | 2.0% | 2.0% | 3.4% | 1.9% | 1.0% | 1.6% |
| fatty acid | 3.0% | 3.0% | 8.3% |  |  | 16.0% |
| protease | 1.0% | 1.0% | 0.7% | 1.0% |  | 2.5% |
| amylase | 0.2% | 0.2% | 0.2% |  |  | 0.3% |
| lipase |  |  |  | 0.2% |  |  |
| borax | 1.5% | 1.5% | 2.4% | 2.9% |  |  |
| calcium and sodium formate | 0.2% | 0.2% |  |  |  |  |
| formic acid |  |  |  |  |  | 1.1% |
| amine ethoxylate polymers | 1.8% | 1.8% | 2.1% |  |  | 3.2% |
| sodium polyacrylate |  |  |  |  | 0.2% |  |
| sodium polyacrylate copolymer |  |  |  | 0.6% |  |  |
| DTPA[1] | 0.1% | 0.1% |  |  |  | 0.9% |
| DTPMP[2] |  |  | 0.3% |  |  |  |

TABLE 7A-continued

Liquid Detergent Formulations Comprising the Inventive Hueing Agent

| Ingredient | 1a wt % | 1b wt % | 1c wt % | 1d wt % | 1e wt % | 1f[5] wt % |
|---|---|---|---|---|---|---|
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| Hueing Agent[6] | 0.01% | | | | 0.005% | |
| Hueing Agent[7] | | 0.01% | 0.02% | 0.003% | | 0.012% |
| water | balance | balance | balance | balance | balance | balance |
| | 100.0% | 100.0% | 100.0% | 100.0% | 100.0% | 100.0% |

TABLE 7B

Liquid Detergent Formulations Comprising the Inventive Hueing Agent

| Ingredient | 1g wt % | 1h wt % | 1i wt % | 1j wt % | 1k wt % | 1l[5] wt % |
|---|---|---|---|---|---|---|
| sodium alkyl ether sulfate | 14.4% | 14.4% | | 9.2% | 5.4% | |
| linear 1benzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 1.7% |
| amylase | 0.2% | 0.2% | 0.2% | | | 0.6% |
| lipase | | | | 0.2% | | 0.2% |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| Hueing Agent[6] | 0.01% | | | | 0.005% | |
| Hueing Agent[7] | | 0.01% | 0.02% | 0.003% | | 0.012% |
| opacifier[8] | | | 0.5% | | | |
| water | balance | balance | balance | balance | balance | balance |
| | 100.0% | 100.0% | 100.0% | 100.0% | 100.0% | 100.0% |

Footnotes for Formulations 1a-1:
[1] diethylenetriaminepentaacetic acid, sodium salt
[2] diethylenetriaminepentakismethylenephosphonic acid, sodium salt
[3] ethylenediaminetetraacetic acid, sodium salt
[4] a non-tinting dyes used to adjust formula color
[5] compact formula, packaged as a unitized dose in polyvinyl alcohol film
[6] thiophene azo hueing agent from Table 5, Examples 1-21, preferably with hueing efficiency >10 and wash removability 30-85%
[7] thiophene azo hueing agent from Table 5, Examples 22-42, preferably with hueing efficiency >10 and wash removability 30-85%
[8] Acusol OP301

Formulations 2a-2e: Granular Detergent Formulations

Table 8 provides examples of granular detergent formulations which include at least one thiophene azo dye of the present invention as a hueing agent. The formulations are shown in Table 8 as Formulations 2a through 2e.

TABLE 8

Granular Detergent Formulations Comprising the Inventive Hueing Agent

| Ingredient | 2a wt % | 2b wt % | 2c wt % | 2d wt % | 2e wt % |
|---|---|---|---|---|---|
| Na linear alkylbenzene sulfonate | 3.4% | 3.3% | 11.0% | 3.4% | 3.3% |
| Na alkylsulfate | 4.0% | 4.1% | | 4.0% | 4.1% |
| Na alkyl sulfate (branched) | 9.4% | 9.6% | | 9.4% | 9.6% |

TABLE 8-continued

Granular Detergent Formulations Comprising the Inventive Hueing Agent

| Ingredient | 2a wt % | 2b wt % | 2c wt % | 2d wt % | 2e wt % |
|---|---|---|---|---|---|
| alkyl ethoxylate | | | 3.5% | | |
| type A zeolite | 37.4% | 35.4% | 26.8% | 37.4% | 35.4% |
| sodium carbonate | 22.3% | 22.5% | 35.9% | 22.3% | 22.5% |
| sodium sulfate | 1.0% | | 18.8% | 1.0% | |
| sodium silicate | | | 2.2% | | |
| protease | 0.1% | 0.2% | | 0.1% | 0.2% |
| sodium polyacrylate | 1.0% | 1.2% | 0.7% | 1.0% | 1.2% |
| carboxymethylcellulose | | | 0.1% | | |
| PEG 600 | | 0.5% | | | 0.5% |
| PEG 4000 | | 2.2% | | | 2.2% |
| DTPA | 0.7% | 0.6% | | 0.7% | 0.6% |
| fluorescent whitening agent | 0.1% | 0.1% | 0.1% | 0.1% | 0.1% |
| sodium percarbonate | | 5.0% | | | 5.0% |
| sodium nonanoyloxybenzenesulfonate | | 5.3% | | | 5.3% |
| silicone suds suppressor | 0.02% | 0.02% | | 0.02% | 0.02% |
| perfume | 0.3% | 0.3% | 0.2% | 0.3% | 0.3% |
| Hueing Agent [1] | 0.004% | | | | 0.02% |
| Hueing Agent [2] | | 0.006% | 0.002% | 0.004% | |
| water and miscellaneous | balance | balance | balance | balance | balance |
| | 100.0% | 100.0% | 100.0% | 100.0% | 100.0% |

Footnotes for Formulations 2a-e:
[1] thiophene azo hueing agent from Table 5, Examples 1-21, preferably with hueing efficiency >10 and wash removability 30-85%
[2] thiophene azo hueing agent from Table 5, Examples 22-42, preferably with hueing efficiency >10 and wash removability 30-85%

Exemplary Fabric Care Compositions

Formulations 3a-3d: Liquid Fabric Care Compositions

Table 9 provides examples of liquid fabric care compositions which include at least one thiophene azo dye of the present invention as a hueing agent. The compositions are shown in Table 9 as Formulations 3a through 3d.

TABLE 9

Liquid Fabric Care Compositions Comprising the Inventive Hueing Agent

| Ingredients | 3a | 3b | 3c | 3d |
|---|---|---|---|---|
| Fabric Softening Active [a] | 13.70% | 13.70% | 13.70% | 13.70% |
| Ethanol | 2.14% | 2.14% | 2.14% | 2.14% |
| Cationic Starch [b] | 2.17% | 2.17% | 2.17% | 2.17% |
| Perfume | 1.45% | 1.45% | 1.45% | 1.45% |
| Phase Stabilizing Polymer [c] | 0.21% | 0.21% | 0.21% | 0.21% |
| Calcium Chloride | 0.147% | 0.147% | 0.147% | 0.147% |
| DTPA [d] | 0.007% | 0.007% | 0.007% | 0.007% |
| Preservative [e] | 5 ppm | 5 ppm | 5 ppm | 5 ppm |
| Antifoam [f] | 0.015% | 0.015% | 0.015% | 0.015% |
| Hueing Agent [g] | 30 ppm | | | 15 ppm |
| Hueing Agent [h] | | 30 ppm | | |
| Hueing Agent [i] | | | 30 ppm | 15 ppm |
| Tinopal CBS-X [j] | 0.2 | 0.2 | 0.2 | 0.2 |
| Ethoquad C/25 [k] | 0.26 | 0.26 | 0.26 | 0.26 |
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

Footnotes for Formulations 3a-d:
[a] N,N-di(tallowoyloxyethyl)-N,N-dimethylammonium chloride.
[b] Cationic starch based on common maize starch or potato starch, containing 25% to 95% amylose and a degree of substitution of from 0.02 to 0.09, and having a viscosity measured as Water Fluidity having a value from 50 to 84.
[c] Copolymer of ethylene oxide and terephthalate having the formula described in U.S. Pat. No. 5,574,179 at col. 15, lines 1-5, wherein each X is methyl, each n is 40, u is 4, each $R^1$ is essentially 1,4-phenylene moieties, each $R^2$ is essentially ethylene, 1,2-propylene moieties, or mixtures thereof.
[d] Diethylenetriaminepentaacetic acid.
[e] KATHON ® CG available from Rohm and Haas Co.
[f] Silicone antifoam agent available from Dow Corning Corp. under the trade name DC2310.
[g] thiophene azo hueing agent from Table 5, Examples 1-21, preferably with hueing efficiency >10 and wash removability 30-85%
[h] thiophene azo hueing agent from Table 5, Examples 22-42, preferably with hueing efficiency >10 and wash removability 30-85%
[i] thiophene azo hueing agent from Table 5, Examples 1-42, preferably with hueing efficiency >10 and wash removability 30-85%
[j] Disodium 4,4'-bis-(2-sulfostyryl) biphenyl, available from Ciba Specialty Chemicals.
[k] Cocomethyl ethoxylated [15] ammonium chloride, available from Akzo Nobel.

The dimensions and values disclosed herein are not to be understood as being strictly limited to the exact numerical values recited. Instead, unless otherwise specified, each such dimension is intended to mean both the recited value and functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry care composition comprising:
   a) a thiophene azo dye containing a formally charged moiety, with the proviso that the dye does not comprise a meta-bis(2-hydroxy-3-trimethylammoniumpropyl) amino tolyl group; and
   b) a laundry care ingredient
wherein said thiophene azo dye has the following formula:

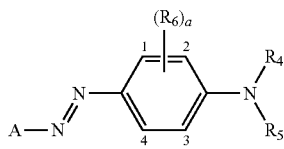

wherein the moiety A is selected from a group consisting of the moiety No. 15

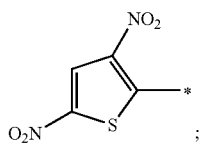

$a=1$, $R_6$ is selected from the group consisting of entry No. 5

| R6 Substituent—Identity and Position on Aniline Ring | | | | |
|---|---|---|---|---|
| No. | 1 | 2 | 3 | 4 |
| 5 |   |   |   | —Me; | and $R_4$ and $R_5$ grouping is selected from the group consisting of entry No. 13

| $R_4$ and $R_5$ Groupings | |
|---|---|
| No. $R_4$ | $R_5$ |
| 13 Ethyl | [structure with $N^{\oplus}$, $CO_2^{\ominus}$, and polyether chain ending in *] |

2. The laundry care composition of claim 1, said laundry care composition comprising, based on total laundry care composition weight, less than 15% builder.

3. The laundry care composition of claim 1, said laundry care composition is a multi-compartment unit dose product.

4. The laundry care composition of claim 1, said laundry care composition comprising, based on total laundry care composition weight, a total of no more than 20% water.

5. The laundry care composition of claim 1, said laundry care composition comprising, based on total laundry care composition weight, from about 10% to about 70% of a water-miscible organic solvent having a molecular weight of greater than 70 Daltons.

6. The laundry care composition of claim 1, said laundry care composition comprising, based on total laundry care composition weight, a perfume microcapsule comprising a core and a shell that encapsulates said core, said perfume microcapsule having an average particle size of from about 0.01 microns to about 200 microns.

7. A method of treating and/or cleaning a surface or fabric comprising the steps of optionally washing and/or rinsing said surface or fabric, contacting said surface or fabric with a laundry care composition of claim 1, then optionally washing and/or rinsing said surface and/or fabric then optionally letting said surface or fabric to dry and/or actively drying said surface or fabric.

* * * * *